United States Patent [19]
Iwasaki

[11] Patent Number: 5,802,478
[45] Date of Patent: Sep. 1, 1998

[54] AUTOMOTIVE VEHICLE SUSPENSION CONTROL SYSTEM

[75] Inventor: Katsuya Iwasaki, Atsugi, Japan

[73] Assignee: Unisia Jecs Corporation, Atsugi, Japan

[21] Appl. No.: 598,941

[22] Filed: Feb. 9, 1996

[30] Foreign Application Priority Data

Feb. 14, 1995 [JP] Japan .................. 7-025119
Feb. 28, 1995 [JP] Japan .................. 7-040662

[51] Int. Cl.⁶ ............................................. B60G 17/015
[52] U.S. Cl. .................... 701/37; 701/38; 280/707; 280/840; 180/41
[58] Field of Search .............. 364/424.046, 424.047; 280/707, 840, 6.1; 180/41

[56] References Cited

U.S. PATENT DOCUMENTS

| | | | |
|---|---|---|---|
| 5,173,858 | 12/1992 | Wada et al. | 364/424.046 |
| 5,347,457 | 9/1994 | Tanaka et al. | 364/424.05 |
| 5,510,985 | 4/1996 | Yamaoka et al. | 364/424.046 |
| 5,587,907 | 12/1996 | Shibata et al. | 364/424.046 |

FOREIGN PATENT DOCUMENTS

| | | |
|---|---|---|
| 0 157 181 | 10/1985 | European Pat. Off. . |
| 0 616 912 | 9/1994 | European Pat. Off. . |
| 0 659 598 | 6/1995 | European Pat. Off. . |
| 0 706 906 | 4/1996 | European Pat. Off. . |
| 4-191109 | 7/1992 | Japan . |
| 2 260 106 | 4/1993 | United Kingdom . |
| 2 270 890 | 3/1994 | United Kingdom . |

*Primary Examiner*—Tan Q. Nguyen
*Attorney, Agent, or Firm*—Foley & Lardner

[57] ABSTRACT

A suspension control system for use with an automotive vehicle supported on front and rear road pairs of road wheels. Shock absorbers are provided between sprung and unsprung masses of the vehicle at the front and rear road wheel side tower positions for providing variable damping force characteristics. First behaviors of the vehicle at the front road wheel side tower positions are sensed. A predetermined transfer function is used to calculate second behaviors of the vehicle at the rear road wheel side tower positions based, on the sensed first vehicle behaviors. The damping force characteristics of the shock absorbers mounted at the front road wheel side tower positions are controlled based on the sensed first vehicle behaviors. The damping force characteristics of the shock absorbers mounted at the rear road wheel side tower positions are controlled based on the calculated second vehicle behaviors.

38 Claims, 24 Drawing Sheets

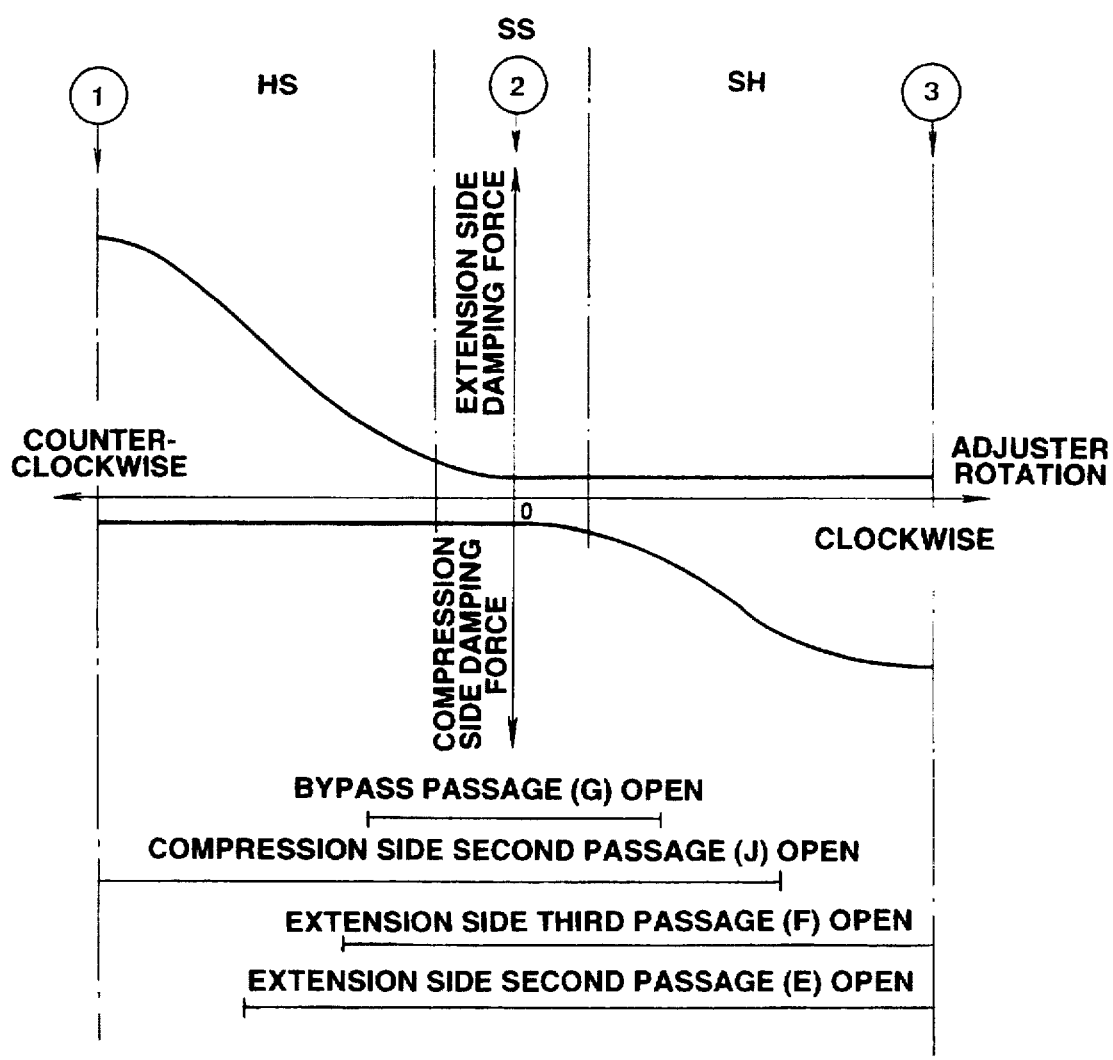

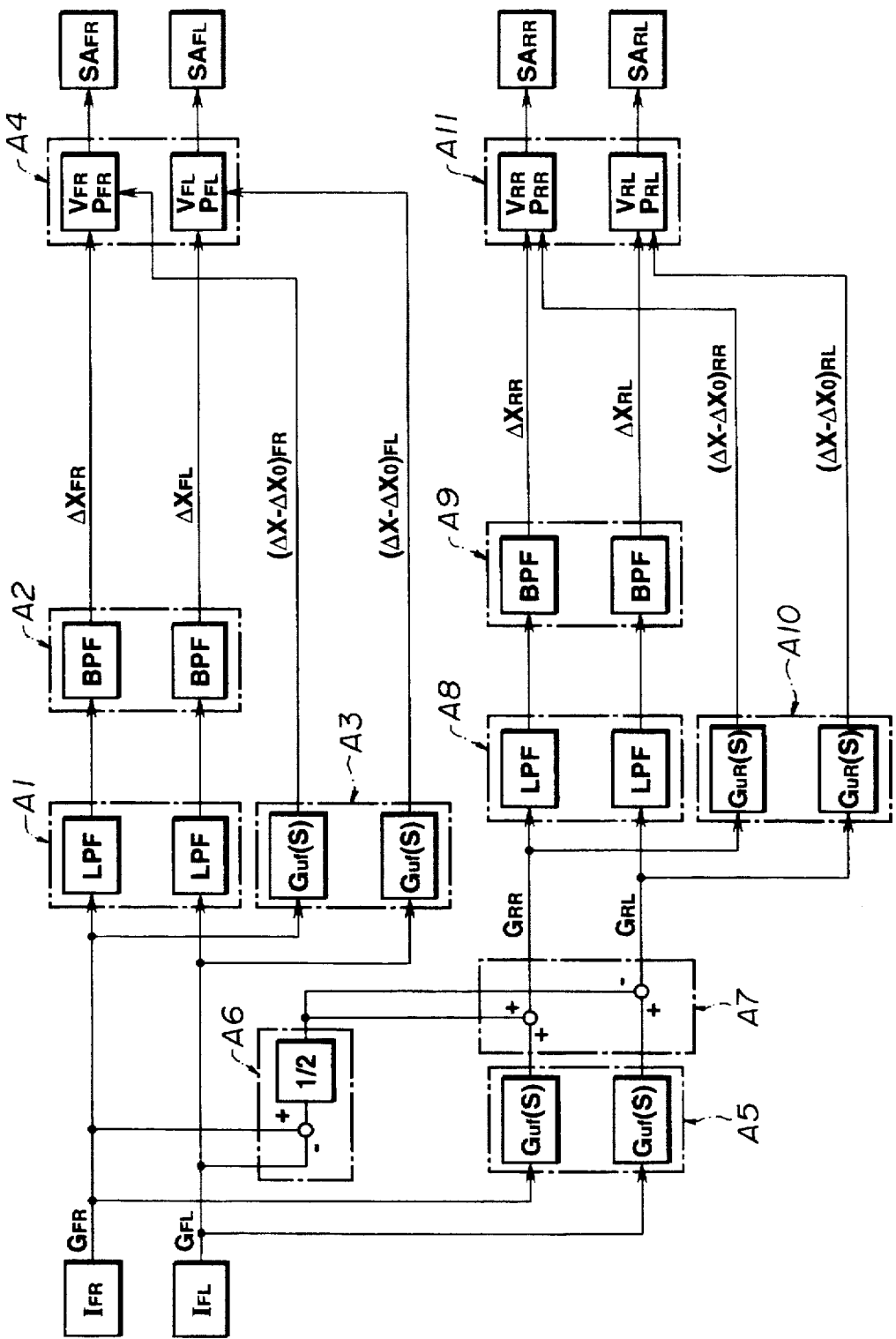

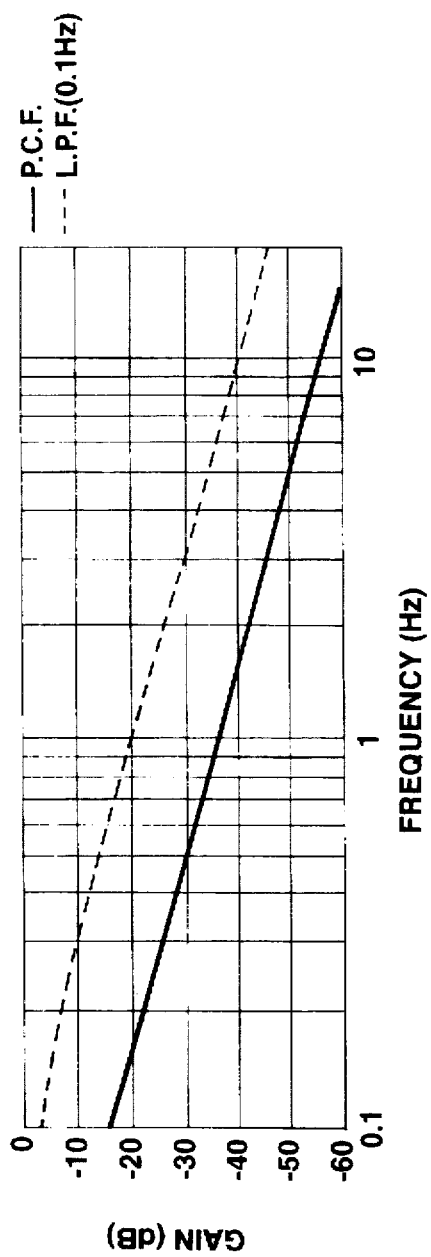
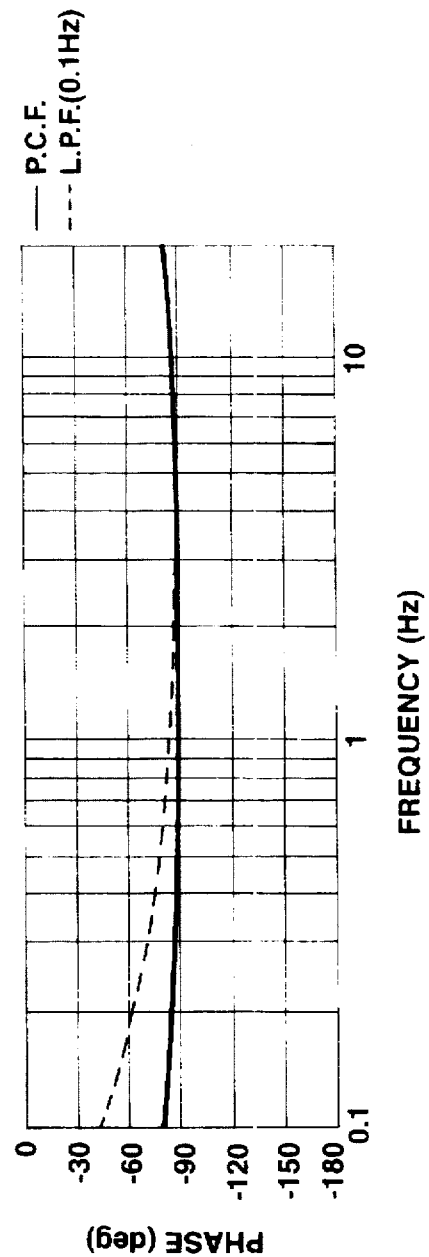
FIG.14A
FIG.14B

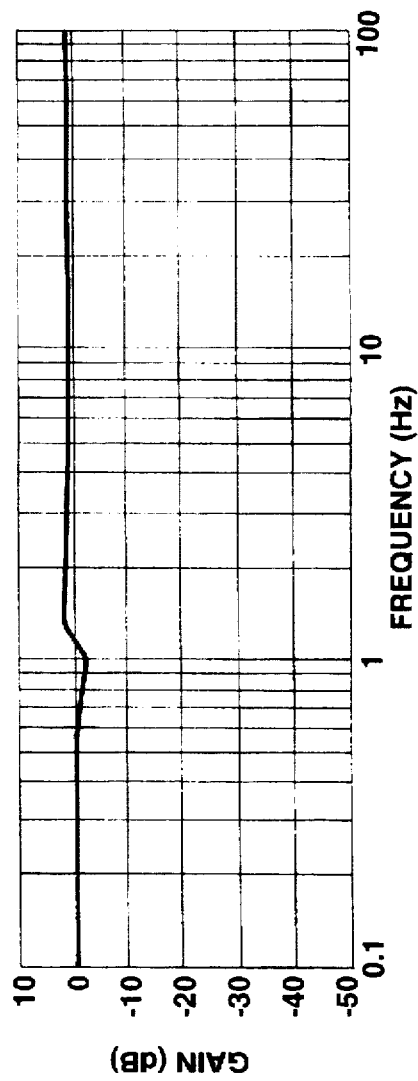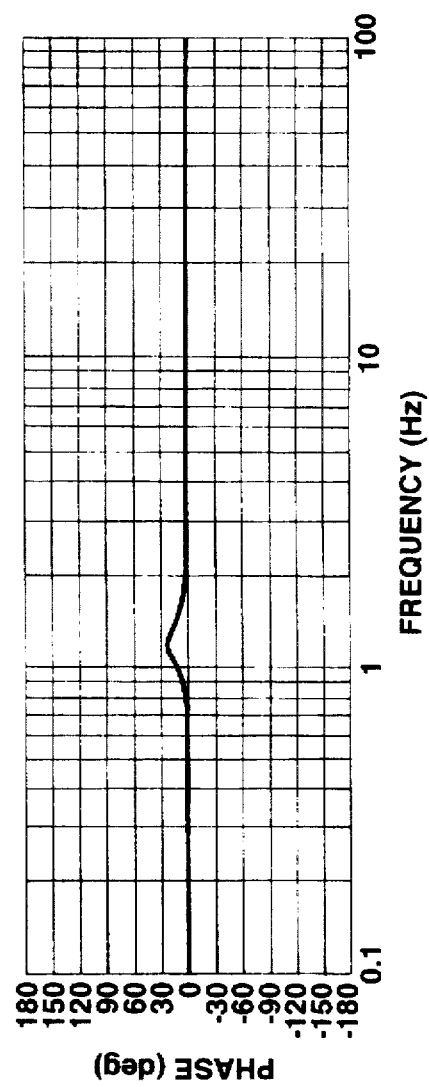
FIG.19A
FIG.19B

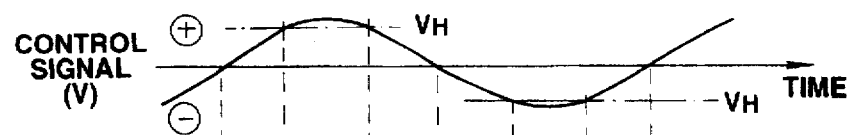
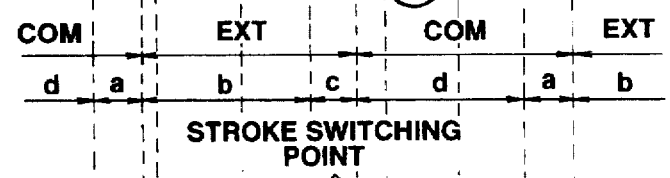
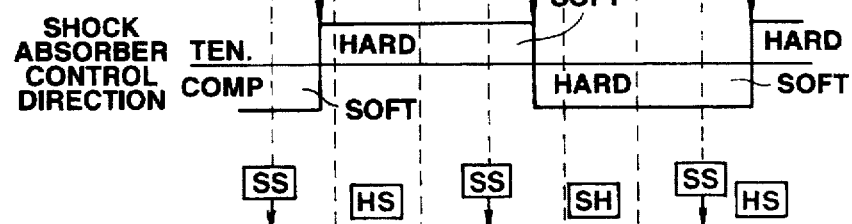
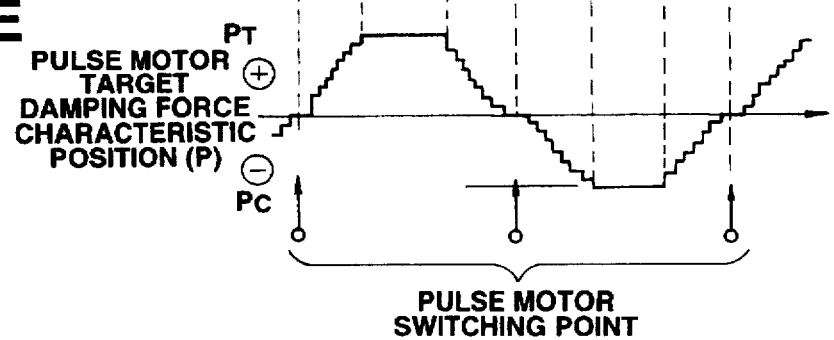

AUTOMOTIVE VEHICLE SUSPENSION CONTROL SYSTEM

BACKGROUND OF THE INVENTION

This invention relates to a suspension control system for use with an automotive vehicle supported on front and rear pairs of road wheels to control the damping force characteristic of each of the shock absorbers interposed between a sprung mass (vehicle body) and an unsprung mass (corresponding one of the road wheels).

For example, Japanese Patent Kokai No. 4-191109 discloses such an automotive vehicle suspension control system which controls an actuator to increase or decrease the force applied to support the vehicle body against the rear road wheels in response to vibration inputs produced from the respective front road wheels when the vehicle passes a rough road surface portion. When the vibration inputs from the front road wheels exceeds a predetermined value, the actuator is operated in a direction to decrease the vibration inputs at a time point when the rear road wheels will pass the same rough road surface portion. This time point is estimated based on the vehicle speed. That is, the conventional suspension control system makes such a preview control as to delay the time at which the vibration inputs from the front road wheels are used to produce correction signals for the rear road wheel side controls according to the vehicle speed. Since even though great vibration inputs occurs to the vehicle body when the front road wheels pass the rough road surface portion, the rear road wheel side controls are made with reference to the vibration inputs produced to the vehicle body when the front road wheels pass the rough road surface portion, the vibration inputs can be reduced to a greater extent when the rear road wheels pass the rough road surface portion than when the front road wheels pass the rough road surface portion.

However, the conventional suspension control system requires vehicle behavior sensors for detecting the sprung mass vertical velocities and/or relative velocities for the respective road wheels, resulting in a complex and expensive suspension control system. Furthermore, the sprung mass resonance frequencies are different for the front road wheel side controls than for the rear road wheel side controls in view of the differences in the sprung mass weight and the suspension spring constant. For this reason, it is very difficult, if not impossible to estimate accurate vehicle behaviors on the rear wheel side and thus to produce optimum control forces.

SUMMARY OF THE INVENTION

It is a main object of the invention to provide a simple and inexpensive automotive vehicle suspension control system which can estimate accurate vehicle behaviors on the rear wheel side and produce optimum control force with the use of a reduced number of vehicle behavior sensors.

There is provided, in accordance with the invention, a suspension control system for use with an automotive vehicle supported on front-left and -right road wheels at front-left and -right road wheel side tower positions and also on rear-left and -right road wheels at rear-left and -right road wheel side tower positions. The suspension control system comprises shock absorbers provided between sprung and unsprung masses of the vehicle at the respective tower positions for providing variable damping force characteristics, sensor means for sensing first behaviors of the vehicle at the front-left and -right road wheel side tower positions, and calculation means for calculating second behaviors of the vehicle at the rear-left and -right road wheel side tower positions based on the sensed first vehicle behaviors. The calculation means employs a predetermined transfer function with a road surface input as its transfer route, and means for calculating a difference between the sensed first vehicle behaviors. The suspension control system also includes means for producing first control signals for the shock absorbers mounted at the front-left and -right road wheel side tower positions based on the sensed first vehicle behaviors, means for producing second control signals for the shock absorbers mounted at the rear-left and -right road wheel side tower positions based on the calculated second vehicle behaviors, and control means responsive to the first and second control signals for controlling the damping force characteristics of the corresponding shock absorbers.

In another aspect of the invention, there is provided a suspension control system for use with an automotive vehicle having a vehicle body supported on front-left and -right road wheels at front-left and-right road wheel side tower positions and also on rear-left and -right road wheels at rear-left and -right road wheel side tower positions. The suspension control system comprises shock absorbers provided between sprung and unsprung masses of the vehicle at the respective tower positions for providing variable damping force characteristics, sensor means for sensing vertical inputs to the vehicle body at the front-left and -right road wheel side tower positions, first bounce rate calculation means for averaging the sensed vertical inputs to calculate a first bounce rate at a center between the front-left and -right road wheel side tower positions, first roll rate calculation means for calculating a first roll rate based on the sensed vertical inputs, second bounce rate calculation means having a predetermined transfer function for calculating a second bounce rate at a center between the rear-left and -right road wheel side tower positions based on the calculated first bounce rate, means for calculating vertical inputs to the vehicle body at the rear-left and -right road wheel side tower positions, means for producing control signals for the shock absorbers based on the sensed and calculated vertical inputs, and control means responsive to the control signals for controlling the damping force characteristics of the corresponding shock absorbers.

BRIEF DESCRIPTION OF THE DRAWINGS

The invention will be described in greater detail by reference to the following description taken in connection with the accompanying drawings, in which:

FIG. 6 is a diagram used in explaining the control ranges in which the shock absorber is operable with rotation of the adjuster placed in the shock absorber;

FIG. 13 is a block diagram showing a signal processing circuit used in the suspension control system of FIG. 1;

FIG. 14A is a graph of gain versus frequency;

FIG. 14B is a graph of phase versus frequency;

FIG. 19A is a graph of gain versus frequency;

FIG. 19B is a graph of phase versus frequency;

FIGS. 21A to 21E are graphs used in explaining the damping force characteristic control;

DETAILED DESCRIPTION OF THE INVENTION

Figure 1:
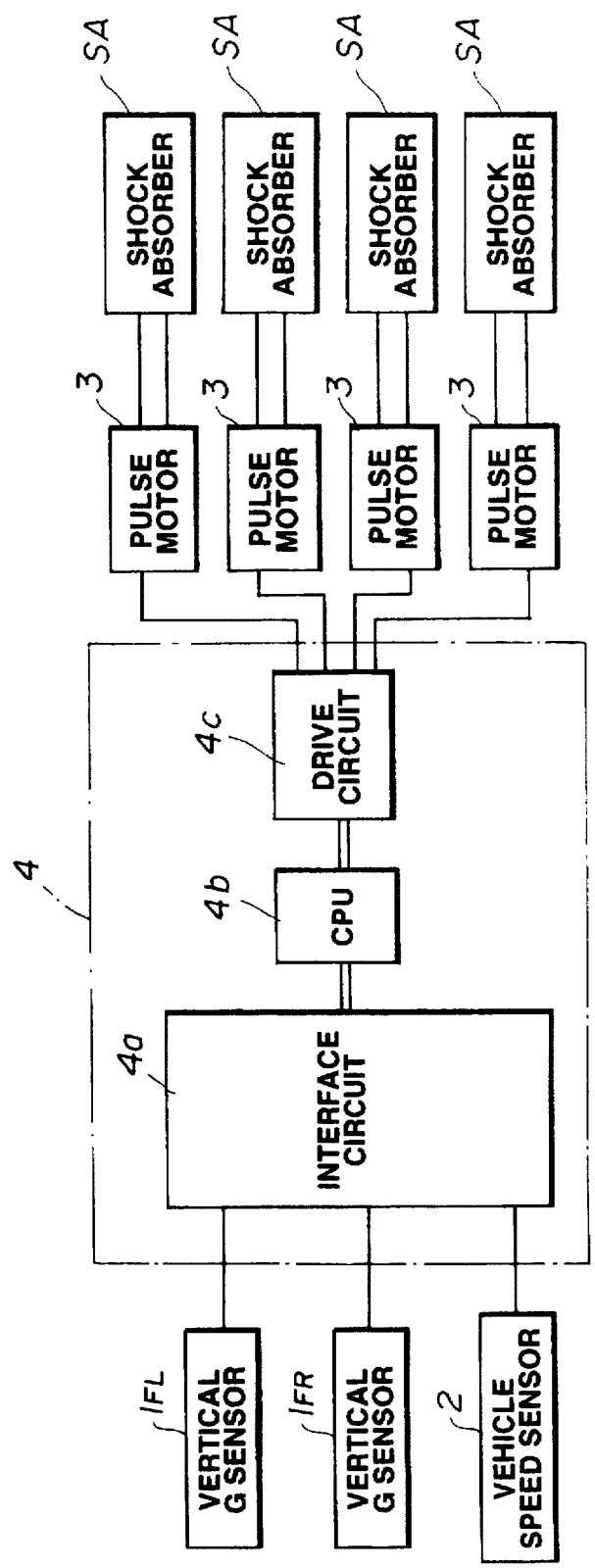
FIG. 1 is a schematic diagram showing one embodiment of an automotive vehicle suspension control system made in accordance with the invention.
Figure 2:
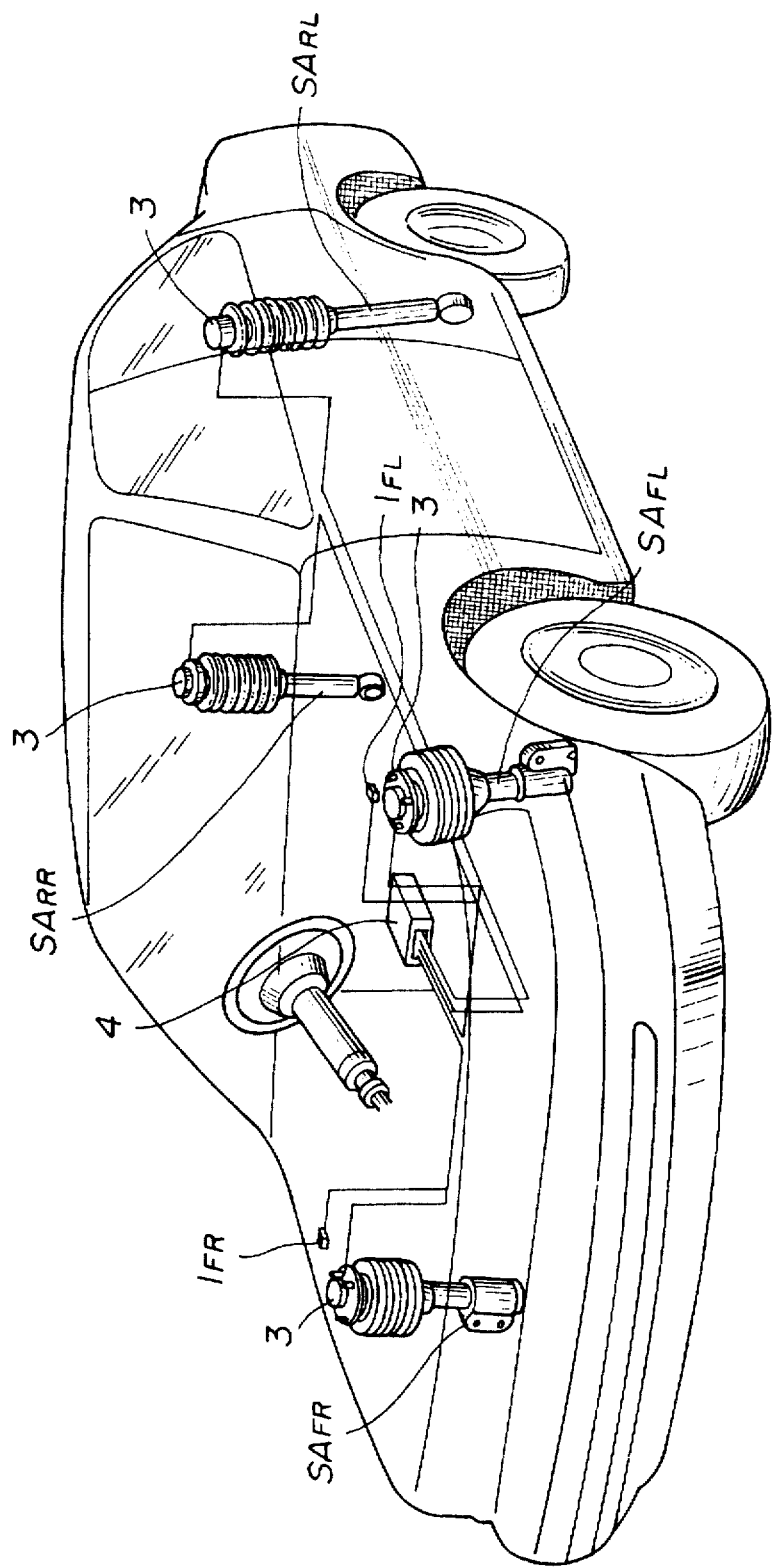
FIG. 2 is a perspective view showing shock absorbers used with an automotive vehicle.

With reference to the drawings and in particular to FIG. 1, there is shown a schematic diagram of an automotive vehicle suspension control system embodying the invention. The suspension control system is shown as including a control unit 4 for driving pulse motors 3 in a manner to provide optimum damping force characteristics for shock absorbers SA. As best shown in FIG. 2, each of four shock absorbers $SA_{FL}$, $SA_{FR}$, $SA_{RL}$ and $SA_{RR}$ is interposed between a sprung mass (vehicle body) and an unsprung mass (tire wheel). The control unit 4, which is mounted near the driver's seat (FIG. 2), includes an interface circuit 4a, a central processing unit (CPU) 4b, and a drive circuit 4c. The central processing unit 4b calculates desired damping force characteristics (in the form of damping coefficients) to be provided for the respective shock absorbers SA. These calculations are made based on signals fed thereto through the interface circuit 4a from various sensors including sprung mass vertical G sensors $1_{FL}$ and $1_{FR}$, and a vehicle speed sensor 2. The vertical G sensors $1_{FL}$ and $1_{FR}$ are mounted on the vehicle body (sprung mass) near the positions (tower positions) at which the respective shock absorbers $SA_{FL}$ and $SA_{FR}$ are attached to the vehicle body, as shown in FIG. 2. The vertical G sensors $1_{FL}$ and $1_{FR}$ sense the vertical accelerations G of the vehicle body (sprung mass) at the respective positions and produce sensor signals indicative of sensed vertical accelerations to the interface circuit 4a. The vertical acceleration sensor signal has a positive sign when the sensed acceleration is directed upward and a negative sign when the sensed acceleration is directed downward. The vehicle speed sensor 2 senses the speed of running of the vehicle and it produces a sensor signal indicative of a sensed vehicle speed to the interface circuit 4a. The central processing unit 4b transfers the control word specifying the calculated damping coefficient to the drive circuit 4c for driving a corresponding one of the step motors 3 to provide the calculated damping force characteristic.

Figure 3:
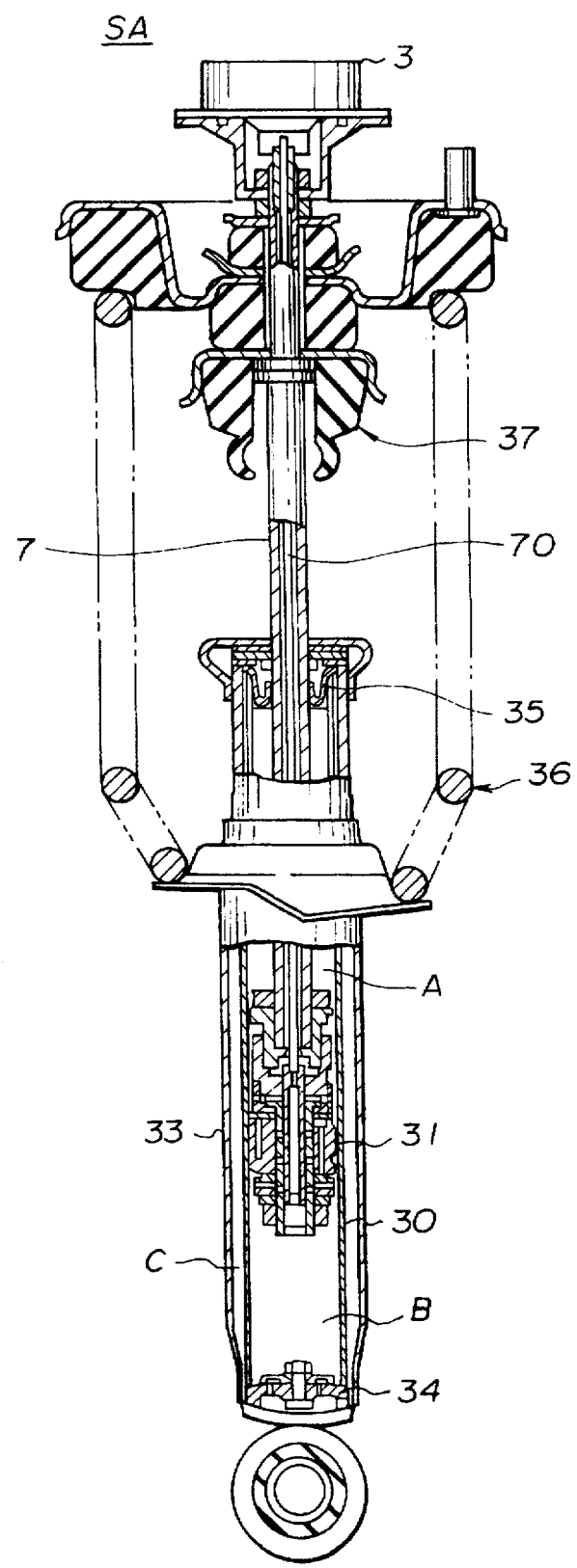
FIG. 3 is a sectional view showing the detailed structure of each of the shock absorbers.

Referring to FIG. 3, there is shown a variable damping force type shock absorber which may be used with the suspension control system. The shock absorber SA includes a cylinder 30 and a piston 31 mounted for reciprocal motion within the cylinder 30. The piston 31 defines upper and lower chambers A and B on the opposite sides thereof. An outer envelop 33 is placed to surround the cylinder 30 so as to define a reservoir C along therewith. A base 34 is provided to separate the reservoir C from the lower chamber B. A piston rod 7 is coupled to the piston 31 for sliding movement. The sliding movement of the piston rod 7 is guided by a guide member 35. A suspension spring 36 is seated between the outer envelop 33 and the vehicle body. The numeral 37, designates a bumper rubber member (or bushing).

Figure 4:
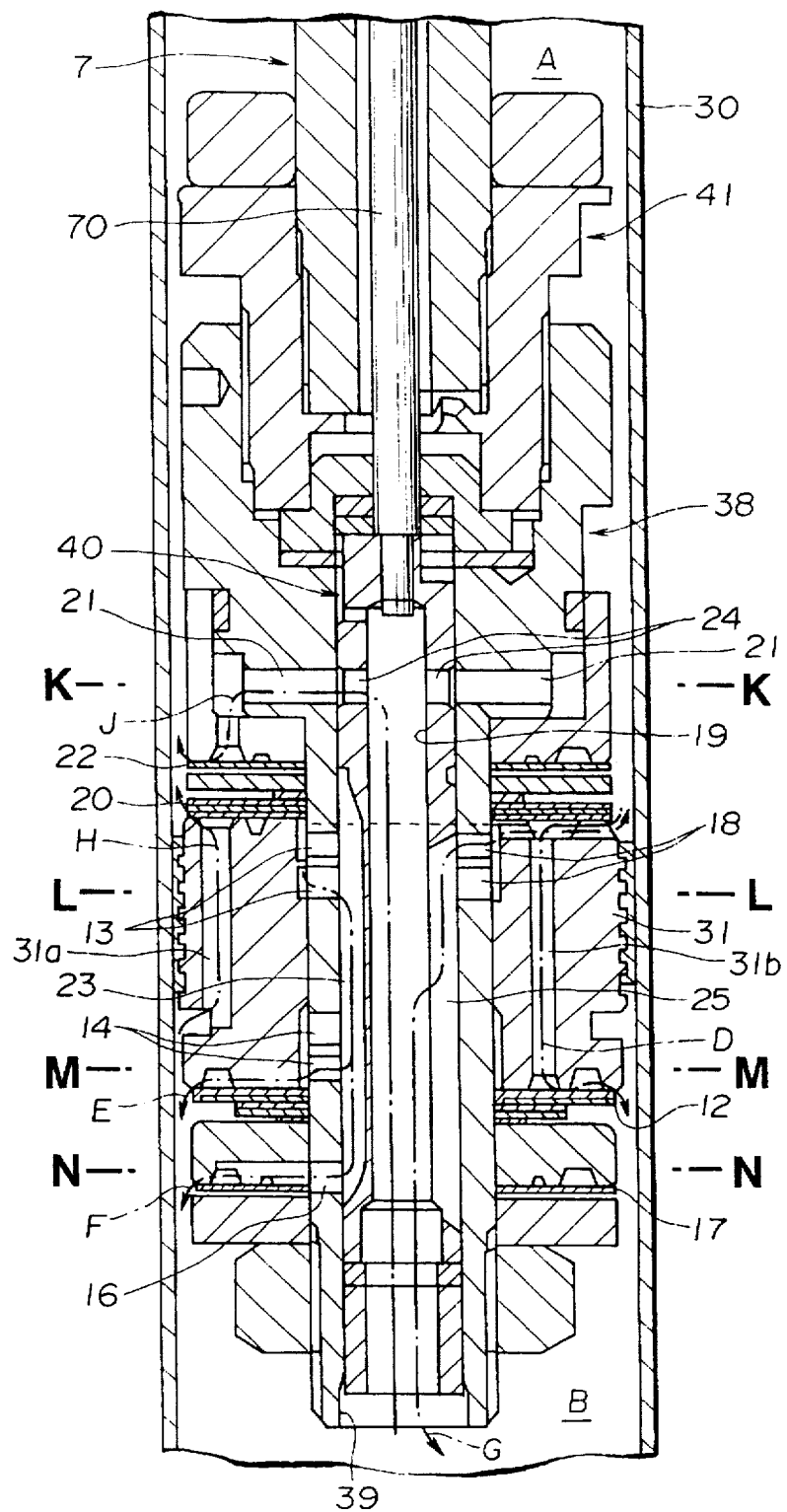
FIG. 4 is a fragmentary enlarged sectional view showing the significant portion of the shock absorber.

Referring to FIG. 4, the piston 31 has first and second passages 31a and 31b extending over the full length of the piston 31. A compression side damping valve 20 is provided in cooperation with the first passage 31a. A extension side damping valve 12 is provided in cooperation with the second passage 31b. The piston rod 7 is threadedly engaged at its tip end with a bound stopper 41. The bound stopper 41 is threadedly engaged within a stud 38 extending through the piston 31. The stud 38 is formed with a flow passage 39 bypassing the first and second passages 31a and 31b to form a passage (passages E, F, G and J) connected between the upper and lower chambers A and B. Provided in cooperation of the flow passage 39 are an adjuster 40, an extension side check valve 17 and a compression side check valve 22. The adjuster 40 is drivingly associated with the corresponding one of the pulse motors 3 which rotates the adjuster through a control rod 70 (FIG. 3) to adjust the effective area of the flow passage 39. The stud 38 is formed with first, second, third, fourth and fifth ports 21, 13, 18, 14 and 16 in a descending scale. The adjuster 40 has a hollow portion 19, first and second lateral holes 24 and 25, and a longitudinal groove 23 formed in its outer peripheral surface. In this structure, thus, four flow passages are formed for connection between the upper and lower chambers A and B during extension stroke (or phase). These flow passages include an extension side first flow passage D extending from the second passage 31b through the inner side of the extension side damping valve 12 to the lower chamber B, an extension side second flow passage E extending from the second port 13 through the longitudinal groove 23 to the fourth port 14 and hence through the outer peripheral side of the extension side damping valve 12 to the lower chamber B, an extension side third flow passage F extending from the second port through the longitudinal groove 23 to the fifth port 16 and hence through the extension side check valve 17 to the lower chamber B and a bypass passage G extending from the third port 18 through the second lateral hole 25 and the hollow portion 19 to the lower chamber B. Furthermore, three flow passages are formed for connection between the upper and lower chambers A and B during compression stroke. These flow passages include a compression side first flow passage H extending from the first passage 31a through the compression side damping valve 20, a compression side second flow passage J extending from the hollow portion 19 through the first lateral hole 24 to the first port 21 and hence through the compression side check valve 22 to the upper chamber A, and a bypass passage G extending from the hollow portion 19 through the second lateral hole 25 and the third port 18 to the upper chamber.

Figure 5:
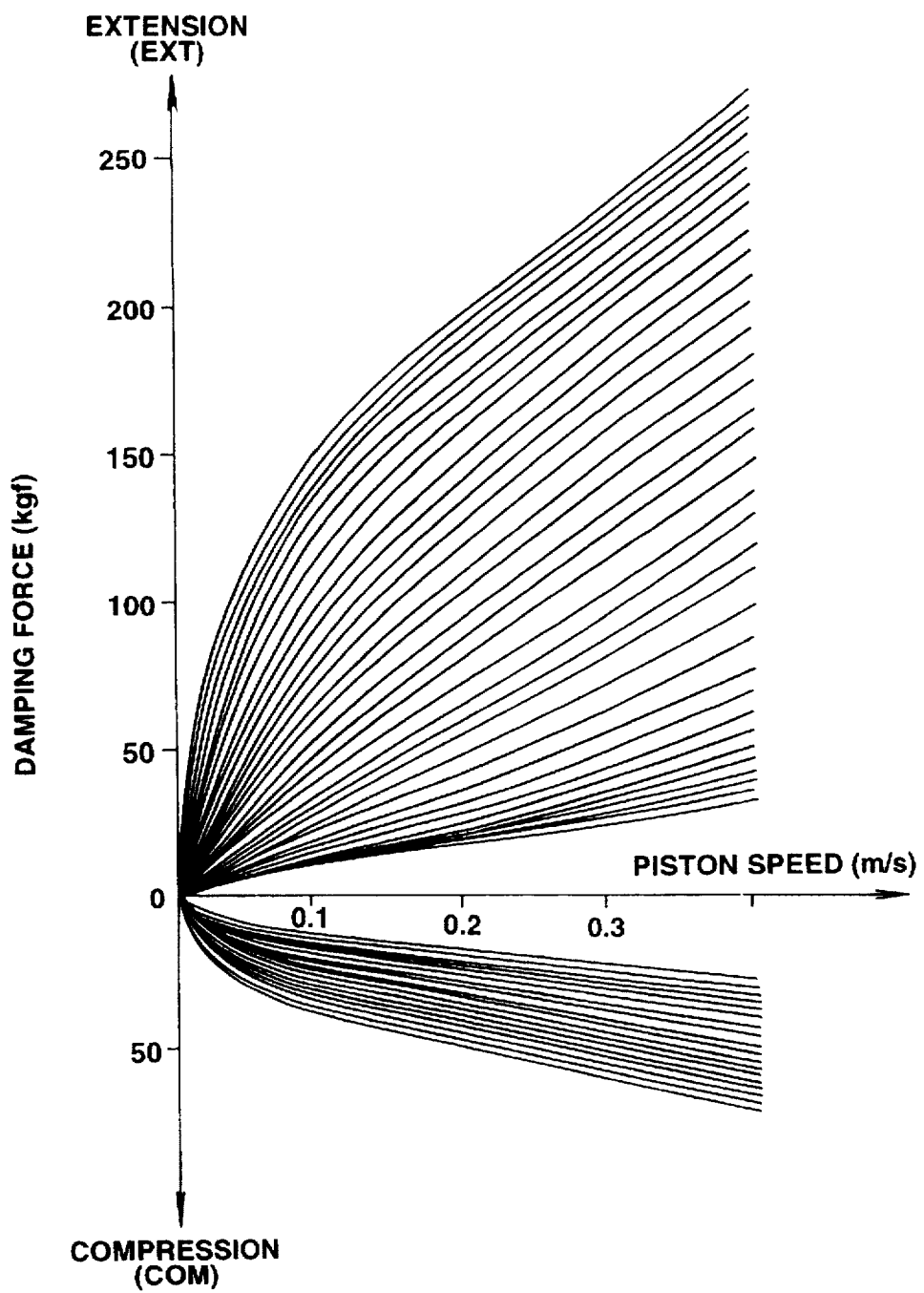
FIG. 5 is a graph of damping force versus piston speed.
Figure 7A:
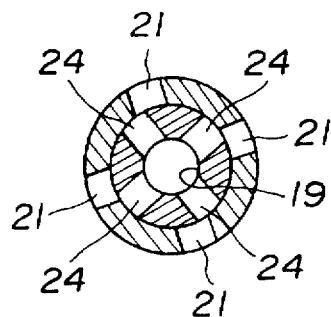
FIG. 7A is a cross-sectional view taken along the line K—K of FIG. 4 in the first position of the adjuster.
Figure 7B:
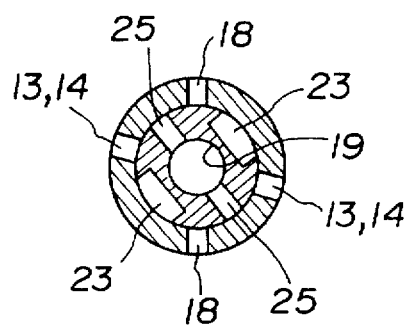
FIG. 7B is a cross-sectional view taken along the lines L—L and M—M of FIG. 4 in the first position of the adjuster.
Figure 7C:
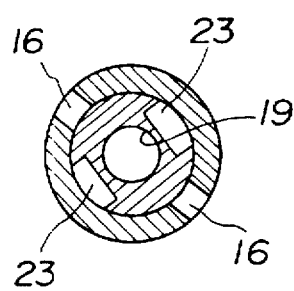
FIG. 7C is a cross-sectional view taken along the line N—N of FIG. 4 in the first position of the adjuster.
Figure 8A:
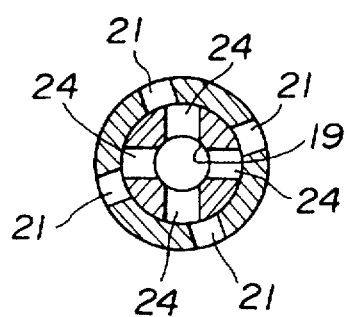
FIG. 8A is a cross-sectional view taken along the line K—K of FIG. 4 in the second position of the adjuster.
Figure 8B:
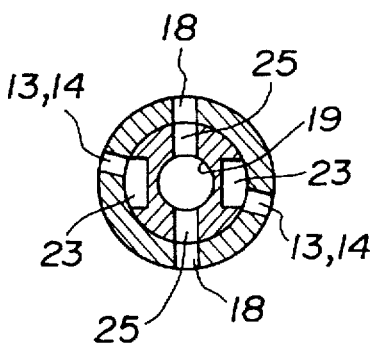
FIG. 8B is a cross-sectional view taken along the lines L—L and M—M of FIG. 4 in the second position of the adjuster.
Figure 8C:
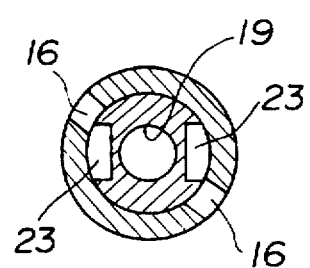
FIG. 8C is a cross-sectional view taken along the line N—N of FIG. 4 in the second position of the adjuster.
Figure 9A:
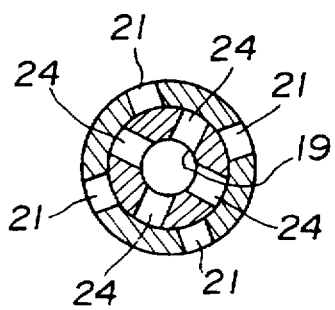
FIG. 9A is a cross-sectional view taken along the line K—K of FIG. 4 in the third -position of the adjuster.
Figure 9B:
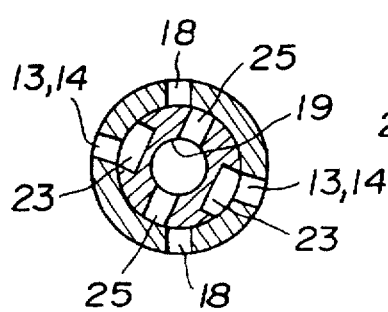
FIG. 9B is a cross-sectional view taken along the lines L—L and M—M of FIG. 4 in the third position of the adjuster.
Figure 9C:
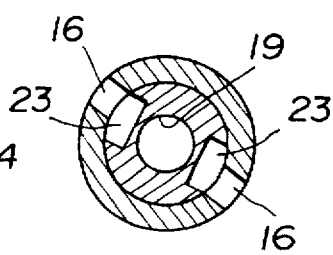
FIG. 9C is a cross-sectional view taken along the line N—N of FIG. 4 in the third position of the adjuster.
Figure 10:
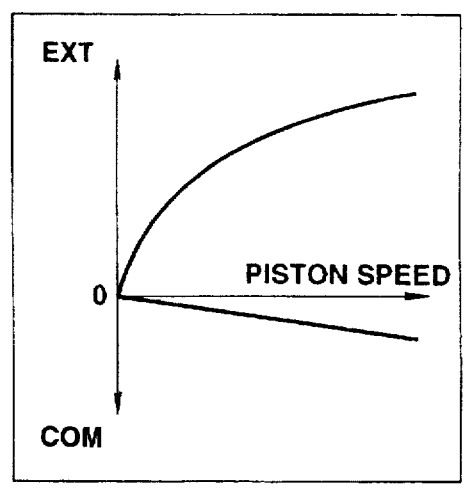
FIG. 10 is a diagram used in explaining the damping force characteristic in the first position of the adjuster.
Figure 11:
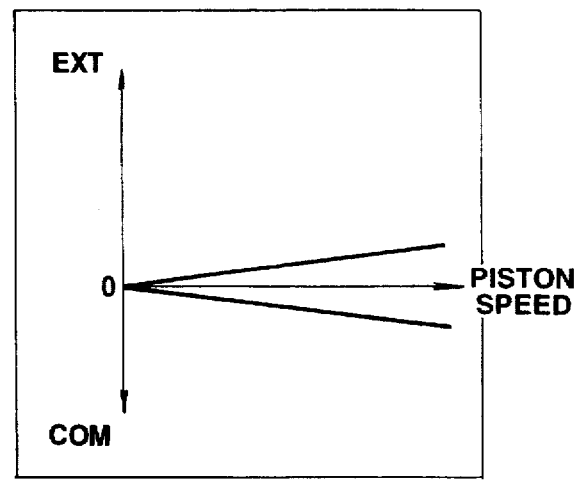
FIG. 11 is a diagram used in explaining the damping force characteristic in the second position of the adjuster.
Figure 12:
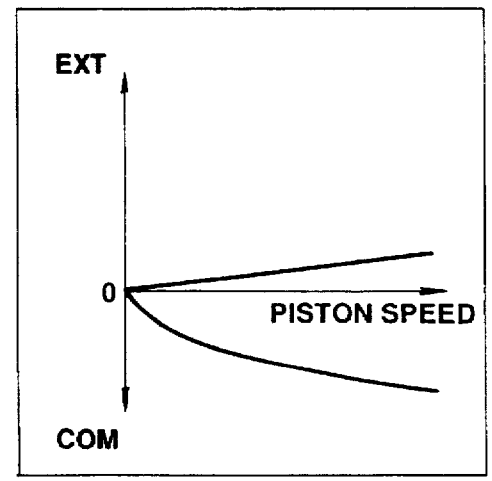
FIG. 12 is a diagram used in explaining the damping force characteristic in the third position of the adjuster.

The adjuster 40 can be rotated to adjust the damping force characteristics of the shock absorber SA in a plurality of steps on both of the extension and compression sides, as shown in FIG. 5. It is now assumed that the adjuster 40 is at a second position. (2) corresponding to a soft range SS, as shown in FIG. 6, where the shock absorber SA has a soft damping force characteristic on both of the expansion and compression sides thereof. This damping force characteristic is shown in FIG. 11. In the second position (2), the components of the piston 31 are positioned as shown in FIGS. 8A, 8B and 8C. FIG. 8A is a cross-sectional view taken along the line K—K of FIG. 4, FIG. 8B is a cross-sectional view taken along the lines L—L and M—M of FIG. 4 and FIG. 8C is a cross-sectional view taken along the line N—N of FIG. 4. When the adjuster 40 rotates in a counter-clockwise direction from the second position (2), the damping force characteristic of the shock absorber SA changes toward its hard characteristic side in a plurality of steps only on the extension side thereof. Eventually, the adjuster 40 comes to a first position (1) corresponding to an extension side hard range HS, as shown in FIG. 6, where the shock absorber SA has a fixed soft characteristic on the compression side thereof. This damping force characteristic is shown in FIG. 10. In the first position (1), the components of the piston 31 are positioned as shown in FIGS. 7A, 7B and 7C. FIG. 7A is a cross-sectional view taken along the line K—K of FIG. 4, FIG. 7B is a cross-sectional view taken along the lines L—L and M—M of FIG. 4 and FIG. 7C is a cross-sectional view taken along the line N—N of FIG. 4. When the adjuster 40 rotates in the clockwise direction from the second position (2), the damping force characteristic of the shock absorber SA changes toward its hard characteristic side in a plurality of steps only on the compression side thereof. Eventually, the adjuster 40 comes to a third position (3) corresponding to a compression side-hard range SH, as shown in FIG. 6, where the shock absorber SA has a fixed soft characteristic on the extension side thereof. This damping force characteristic is shown in FIG. 12. In the third position (3), the components of the piston 31 are positioned as shown in FIGS. 9A, 9B and 9C. FIG. 9A is a cross-sectional view taken along the line K—K of FIG. 4, FIG. 9B is a cross-sectional view taken along the lines L—L and M—M of FIG. 4 and FIG. 9C is a cross-sectional view taken along the line N—N of FIG. 4.

Figure 15A:
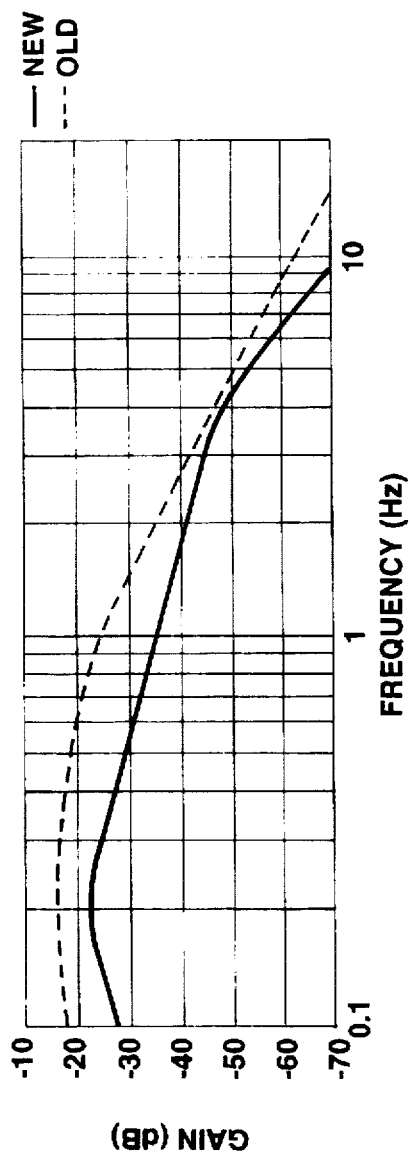
FIG. 15A is a graph of gain versus frequency.
Figure 15B:
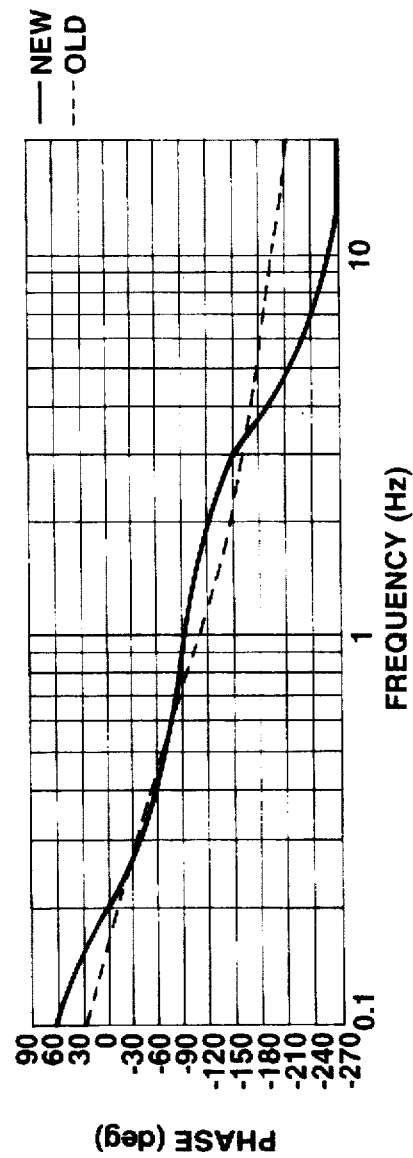
FIG. 15B is a graph of gain versus frequency.

Referring to FIG. 13, there is shown a signal processing circuit included in the interface unit 4a for calculating control signals V ($V_{FL}$, $V_{FR}$, $V_{RL}$, $Q_{RR}$) and also target damping force characteristic positions P ($P_{FL}$, $P_{FR}$, $P_{RL}$, $P_{RR}$) based on the corresponding control signals V for use for damping force characteristic control for the respective shock absorbers SA. The signal processing circuit includes eleven blocks (A1 to A11). The first block A1 employs two velocity converting filters which receive sensor signals fed thereto from the respective vertical G sensors $1_{FL}$ and $1_{FR}$, these sensor signals indicating sprung mass vertical acceleration signals $G_{FL}$ and $G_{FR}$ at the front-left and -right road wheel side tower positions and convert them into sprung mass vertical velocity signals indicative of the sprung mass vertical velocities at the front-left and -right road wheel side tower positions. Each of the velocity converting filters may be taken in the form of a first-order low pass filter LPF having a gain characteristic as indicated by the broken curve of FIG. 14A and a phase characteristic as indicated by the broken curve of FIG. 14B. Alternatively each of the velocity converting filters may be taken in the form of a phase advance compensation filter PCF having a gain characteristic as indicated by the solid curve of FIG. 14A and a phase characteristic as indicated by the solid curve of FIG. 14B. It is to be understood that the use of such phase advance compensation filters permits conversion of the vertical accelerations $G_{FL}$ and $G_{FR}$ into vertical velocities in a wider frequency band. The converted vertical velocity signals are fed from the velocity converting filters to respective band pass filters BPFs (block A2) which filter out the components except for a desired frequency band to produce signals indicative of the sprung mass vertical velocities Δx($Δx_{FL}$, $Δx_{FR}$) at the front-left and -right road wheel side tower positions. The combination of a phase advance compensating filter PCF used in the block A1 and a second-order band pass filter used in the block A2 has a gain characteristic as indicated by the solid curve of FIG. 15A and a phase characteristic as indicated by the solid curve of FIG. 15B. The combination of a first-order low pass filter used in the block A1 and a first-order band pass filter used in the block A2 has a gain characteristic as indicated by the broken curve of FIG. 15A and a phase characteristic as indicated by the broken curve of FIG. 15B. As can be seen from a comparison of these gain and phase characteristics, the phase inclination is smaller in the target control frequency band with the combination of the phase advance compensating filter PCF and the second-order band pass filter than with the combination with the first-order low pass filter and the first-order band pass filter.

Figure 16:
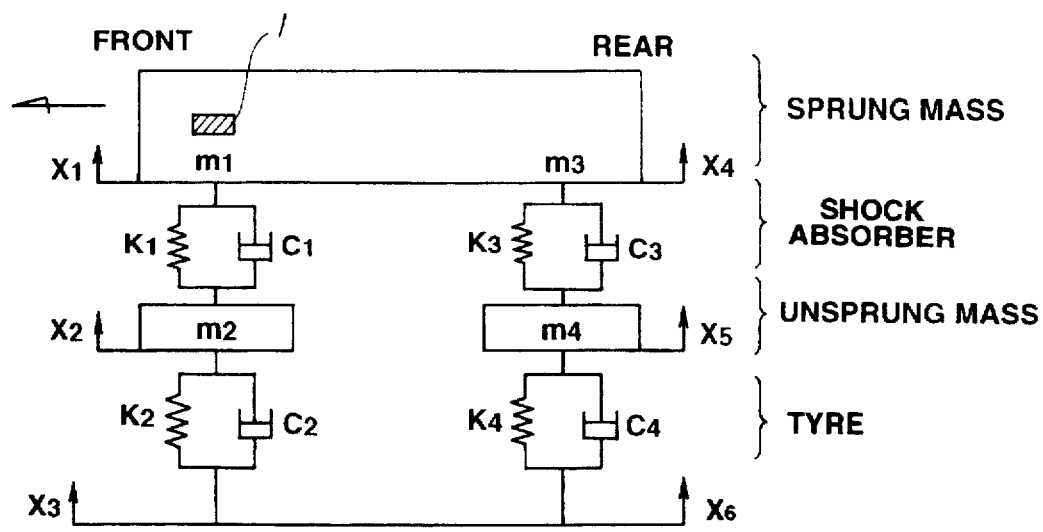
FIG. 16 is a schematic side view used in explaining the transfer function calculation model used in the suspension control system of FIG. 1.
Figure 17:
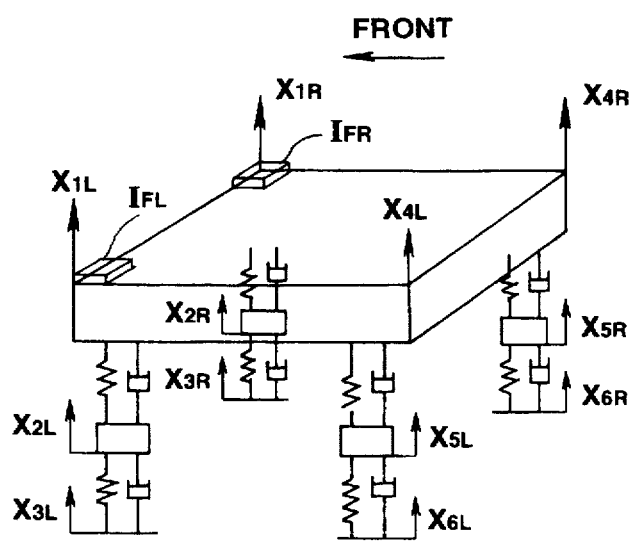
FIG. 17 is a schematic perspective view used in explaining the transfer function calculation model used in the suspension control system of FIG. 1.
Figure 18A:
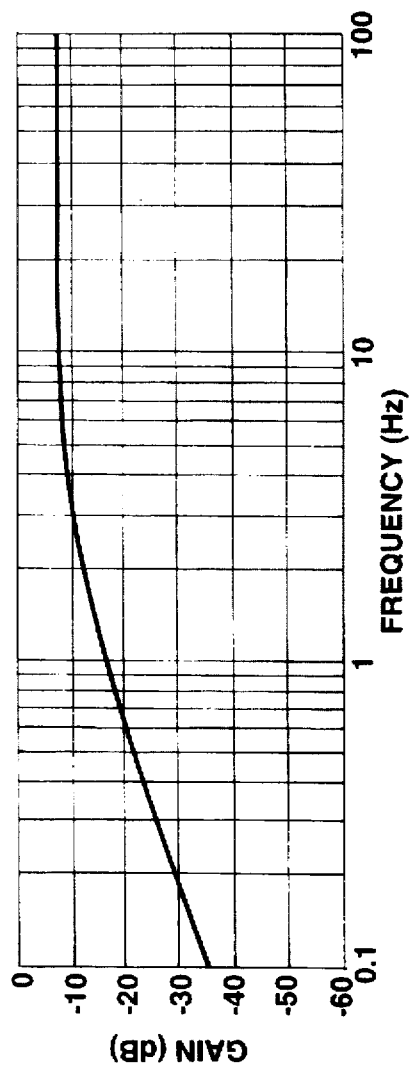
FIG. 18A is a graph of gain versus frequency.
Figure 18B:
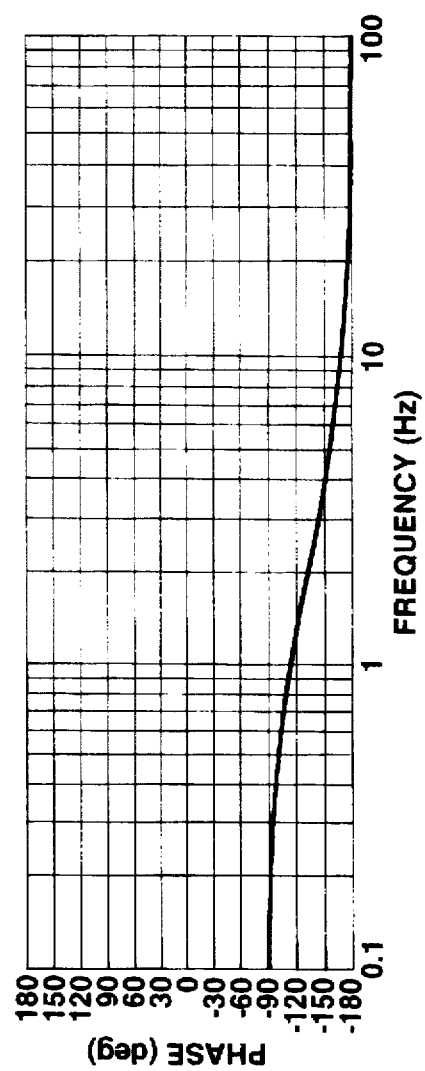
FIG. 18B is a graph of phase versus frequency.

The signal processing circuit also employs transfer functions $G_{U(S)}$(block A3) to derive the relative velocity signals $(\Delta x - \Delta x_0)$ [$(\Delta x - \Delta x_0)_{FL}$, $(\Delta x - \Delta x_0)_{FR}$] based on the vertical accelerations $G_{FL}$ and $G_{FR}$ detected at the front-left and -right road wheel, side tower positions. The transfer function $G_{U(S)}$ are given as:

$$G_{U(S)} = -m_1 S/(c_1 S + k_1) \tag{1}$$

where $m_1$ is the front road wheel side sprung mass, $c_1$ is the attenuation coefficient of the front road wheel side suspensions, $k_1$ is the spring constant of the front road wheel side suspensions, and S is a Laplace operator expressed as $S = \sigma + j\omega$. A transfer function calculation model is illustrated in FIGS. 16 and 17, where the characters $x_1(x_{1L}, x_{1R})$ designate the front road wheel side sprung mass inputs, the characters $x_2(x_{2L}, x_{2R})$ designate the front road wheel side unsprung mass inputs, the characters $x_3(x_{3L}, x_{3R})$ designate the front road wheel side road surface inputs, the character $m_2$ designates the front road wheel side unsprung mass, the character $c_2$ designates the attenuation coefficient of the front road wheels, the character $k_2$ designates the spring constant of the front road wheels, the characters $x_4(x_{4L}, x_{4R})$ designate the rear road wheel side sprung mass inputs, the characters $x_5(x_{5L}, x_{5R})$, designate the rear road wheel side unsprung mass inputs, the characters $x_6(x_{6L}, x_{6R})$ designate the rear road wheel side road surface inputs, the character $m_3$ designates the rear road wheel side sprung mass, the character $m_4$ designates the rear road wheel side unsprung mass, the character $c_3$ designates the attenuation coefficient of the rear road wheel side suspensions, the character $c_4$ designates the attenuation coefficient of the rear road wheels, the character $k_3$ designates the spring constant of the rear road wheel side suspensions, and the character $k_4$ designates the spring constant of the rear road-wheels. The transfer function $G_{U(S)}$ has a gain characteristic as shown in FIG. 18A and a phase characteristic as shown in FIG. 18B.

Returning to FIG. 13, the block A4 employs calculation circuits which receive the signals indicative of the sprung mass vertical velocities $\Delta x(\Delta x_{FL}, \Delta x_{FR})$ at the front-left and -right road wheel side tower positions transferred thereto from the block A2 and also the signals indicative of the relative velocities $(\Delta x - \Delta x_0)$ [$(\Delta x - \Delta x_0)_{FL}$, $(\Delta x - \Delta x_0)_{FR}$] at the front-left and -right road wheel side tower positions transferred thereto from the block A3 for producing control signals $V_{FL}$ and $V_{FR}$ used for the damping force characteristic controls of the front-left and -right road wheel side shock absorbers $SA_{FL}$ and $SA_{FR}$. These control signals $V(V_{FL}, V_{FR})$ are calculated from the following equation:

$$V = \Delta x/(\Delta x - \Delta x_0) \tag{2}$$

In the block B4, the calculation circuits also calculate target damping force characteristic positions $P(P_{FL}, P_{FR})$ from the following equations:

$$P = V/V_H \times Pmax \quad (V < V_H) \tag{3}$$

$$P = Pmax \quad (V \geq V_H) \tag{4}$$

where $V_H$ is a thresholds value set for proportional damping force characteristic control (see FIG. 21A) and Pmax is the maximum damping force characteristic position. As can be seen from Equation (2), the control signals V diverge into infinity, when the relative velocity $(\Delta x - \Delta x_0)$ is zero. In order to avoid this, the target damping force characteristic position P is set at its maximum value Pmax when the absolute value of the relative velocity is less than a small threshold value Xmin ($|\Delta x - \Delta x_0| \leq Xmin$).

The block B5 employs transfer functions $G_{R(S)}$ to calculate the vertical inputs $x_{4dL}$ and $x_{4dR}$ at the rear -left and -right road wheel side tower positions based on the sprung mass vertical accelerations $G_{FL}$ and $G_{FR}$ detected at the front-left and -right road wheel side tower positions, that is, the vertical inputs $x_{1L}$ and $x_{1R}$ at the front-left and -right road wheel side tower positions. As can be seen from FIGS. 16 and 17, $X^{4dL} = G_{FL} \cdot G_{R(S)}$, $x_{4dR} = G_{FR} \cdot G_{R(S)}$. These calculations are made from the following equation:

$$\begin{aligned} G_{R(S)} &= x_{4(S)}/x_{1(S)} \\ &= x_{3(S)}/x_{1(S)} \cdot x_{6(S)}/x_{3(S)} \cdot x_{4(S)}/x_{6(S)} \\ &= G_{1(S)} \cdot G_{2(S)} \cdot G_{3(S)} \end{aligned} \tag{5}$$

where $G_{1(S)}$ is the transfer function from the front road wheel side sprung mass to the road surface, $G_{2(S)}$ is the delay for a input time difference between the vehicle body portions at the front and rear road wheel positions, and $G_{3(S)}$ is the transfer function from the road surface to the rear road wheel side sprung mass. The transfer functions $G_{R(S)}$ have a gain characteristic as shown in FIG. 19A and a phase characteristic as shown in FIG. 19B.

The delay transfer function $G_{2(S)}$ includes a delay transfer function ($G_{D(S)} = e^{-SR}$). A delay time R is set as $R = W_B/S_V - \Phi$ where $W_B$ is the vehicle wheel base, $S_V$ is the vehicle speed, and $\Phi$ is the system response delay time. That is, the delay time R is the difference of the system response delay time $\Phi$ from the delay transfer function corresponding to a delay between the time at which the front wheel side road surface input $x_3$ occurs and the time at which the rear wheel side road surface input $x_6$ occurs. This permits production of control forces to the rear road wheel side shock absorbers with no system response delay.

In the block A6, a calculation is made for the behavior ½ $(G_{FR} - G_{FL})$ of the difference between the sprung mass vertical accelerations $G_{FL}$ and $G_{FR}$ at the front-left and -right road wheel side tower positions. The sprung mass vertical accelerations $G_{FL}$ and $G_{FR}$ at the front-left and -right wheel side tower positions correspond to the rear-left and -right road wheel side sprung mass inputs $x_{4dL}$ and $x_{4dR}$. The calculated behavior corresponds to the inputs $x_{4sL}$ and $x_{4sR}$ at the rear-left and -right road wheel side tower positions resulting from the interference of the vehicle body in the vehicle rolling direction.

In the block A7, a sprung mass vertical acceleration $G_{RL}$ at the rear-left road wheel side tower position is calculated, from Equation (6), by subtracting the vertical input $X_{4dL}$ at the rear-left road wheel side tower position from the input $X_{4sL}$ at the rear-left road wheel side tower position resulting from the interference of the vehicle body in the vehicle rolling direction, and a sprung mass vertical acceleration $G_{RR}$ the rear-right road wheel side tower position is calculated, from Equation (7) by adding the vertical input $x_{4dL}$ at the rear-left road wheel side tower position to the input $X_{4sR}$ at the rear-right road wheel side tower position resulting from the interference of the vehicle body in the vehicle rolling direction.

$$G_{RL} = X_{4sL} - X_{4dL} = G_{FL} \cdot G_{R(S)} - \tfrac{1}{2}(G_{FR} - G_{FL}) \tag{6}$$

$$G_{RR} x_{4sR} = x_{4sL} + x_{4dR} = G_{FR} \quad G_{R(S)} + \tfrac{1}{2}(G_{FR} - G_{FL}) \tag{7}$$

The first block AB employs two velocity converting filters which are similar to those used in the block A1. The velocity converting filters receive the sprung mass vertical accelerations $G_{RL}$ and $G_{RR}$ fed thereto from the block A7 and convert them into sprung mass vertical velocity signals indicative of the sprung mass vertical velocities at the rear-left and -right tower positions. The converted vertical velocity signals are fed from the block A8 to the block A9 which employs band pass filters BPFs which are similar to those used in the block A2. The band pass filter BPPs filter out the components except for a target frequency band to produce signals indicative of the sprung mass vertical velocities $\Delta x(\Delta x_{RL}, \Delta x_{RR})$ at the rear-left and -right road wheel side tower positions. The block A9 employs transfer functions $G_{U_r(S)}$, which are similar to those used in the block A3, to derive the relative velocity signals $(\Delta x - \Delta x_0)$ $[(\Delta x - \Delta x_0)_{RL}, (\Delta x - \Delta x_0)_R]$ based on the vertical accelerations $G_{RL}$ and $G_{RR}$ detected at the rear-left and -right road wheel side tower positions. The block A11 employs calculation circuits which are similar to those used in the block A4. The calculation circuits receives the signals indicative of the sprung mass vertical velocities $\Delta x(\Delta x_{RL}, \Delta x_{RR})$ at the respective rear road wheel side tower positions transferred thereto from the block A9 and also the signals indicative of the relative velocities $(\Delta x - \Delta x_0)$ $[(\Delta x - \Delta x_0)_{RL}, (\Delta x - \Delta x_0)_{RR}]$ at the rear-left and -right road wheel side tower positions transferred thereto from the block A10 to calculate control signals $V_{RL}$ and $V_{RR}$ from Equation (2) for the damping force characteristic controls of the rear-left and -right road wheel side shock absorbers $SA_{RL}$ and $SA_{RR}$. In the block A11, the calculation circuits also calculate target damping force characteristic positions $P(P_{RL}, P_{RR})$ from Equations (3) and (4).

Figure 20:
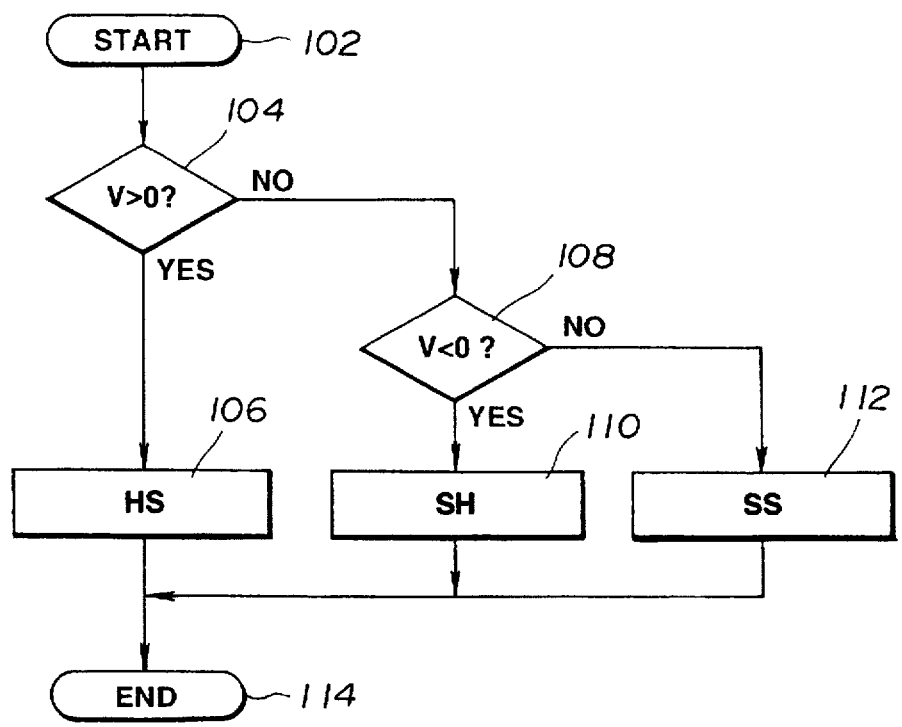
FIG. 20 is a flow diagram of the programming of the digital computer as it is used to control the damping force characteristic of each of the shock absorbers.

FIG. 20 is a flow diagram illustrating the programming of the digital computer as it is used to control the damping force characteristic of each of the shock absorbers SA. The computer program is entered at the point 102. At the point 104 in the program, a determination is made as to whether or not the control signal V for the corresponding one of the shock absorbers SA is positive. If the answer to this question is "yes", then the program proceeds to the point 106 where a command is produced to operate the shock absorber in the extension phase hard range HS and then to the end point 114. Otherwise, the program proceeds to another determination step at the point 108. This determination is as to whether or not the control signal V is negative. If the answer to this question is "yes", then the program proceed to the point 110 where a command is produced to operate the shock absorber in the compression phase hard range SH and then to the end point 114. Otherwise, it means that the control signal is zero and the program proceeds to the point 112 where a command is produced to operate the shock absorber in the soft range SS. Following this, the program proceeds to the end point 114.

Referring to FIGS. 21A to 21E, the damping force characteristic control will be described further. It is now assumed that the control signal V, which is calculated based on the sprung mass vertical velocity $\Delta x$ and relative velocity $(\Delta x - \Delta x_0)$, changes with time as shown in FIG. 21A. When the control signal V is at zero, the shock absorber is controlled to have a damping force characteristic placed in the soft range SS where both of the extension and compression phases exhibit predetermined fixed low damping force characteristics. When the control signal V has a positive value, the damping force characteristic of the shock absorber is controlled in the extension phase hard range HS where the compression phase is fixed at a predetermined low (soft) damping force characteristic. In this case, the damping force characteristic (target damping force characteristic position $P_T$) for the extension phase increases in direct proportion to the control signal V. When the control signal V has a negative value, the damping force characteristic of the shock absorber is controlled in the compression phase hard range SH where the extension phase hard range SH is fixed to a predetermined low damping force characteristic and the damping force characteristic in the compression phase is varied to provide a target damping force characteristic position $P_C$ in direct proportion to the control signal V.

In FIG. 21C, the characteristic a designates a control range where the control signal V, which is calculated based on the sprung mass vertical velocity $\Delta x$ and relative velocity $(\Delta x - \Delta x_0)$, changes from its negative sign (downward) to its positive sign (upward). Since the relative velocity $(\Delta x - \Delta x_0)$ remains negative (the shock absorber operates in the compression phase), the shock absorber is controlled in the extension phase hard range HS according to the sign (direction) of the control signal V. In the control range a, thus, the shock absorber is controlled to provide a soft characteristic in the compression phase.

In the control range b where the sing of the control signal V remains positive (upward) and the relative velocity $(\Delta x - \Delta x_0)$ changes from its negative sign to its positive sign indicating the extension phase (EXT) of the shock absorber, the shock absorber is controlled in the extension phase hard range HS according to the sign (direction) of the control signal V and the shock absorber is in the extension phase. In this control range, thus, the shock absorber is controlled to have a hard characteristic in direct proportion to the control signal V in the extension phase corresponding to the present phase of the shock absorber.

In the control range c where the control signal V changes from its positive sign (upward) to its negative sign (downward) with the relative velocity $(\Delta x - \Delta x_0)$ having a positive sign indicating the extension phase (EXT) of the shock absorber, the shock absorber is controlled in the compression phase hard range SH according to the sign of the control signal V. In this control range, thus, the shock absorber is controlled to have a soft characteristic in the extension phase corresponding to the present phase of the shock absorber.

In the control range d where the sign of the control signal V remains negative (downward) and the relative velocity $(\Delta x - \Delta x_0)$ changes from its positive sign to its negative sign indicating the extension phase (EXT) of the shock absorber, the shock absorber is controlled in the compression phase hard range SH based on the sign of the control signal V. In this control range, thus, the shock absorber is controlled to have a hard characteristic in the compression phase corresponding to the present phase of the shock absorber.

In this embodiment, the shock absorber is controlled to provide a hard characteristic in the present phase of the shock absorber when the sings of the control signal V and the relative velocity $(\Delta x - \Delta x_0)$ are the same (control ranges b and d) and to provide a soft characteristic in the present phase of the shock absorber when the signs of the control signal V and the relative velocity $(\Delta x - \Delta x_0)$ are different (control ranges a and c). It is, therefore, possible to perform the same control as the damping force characteristic control made based on a sky hook theory. Furthermore, the damping force characteristic position has been switched to the hard characteristic side in the previous control ranges a and c at the time when the phase of the shock absorber is switched, that is, in response to a change from the control range a to the control range b and also to a change from the control range c to the control range d (from the soft characteristic to the hard characteristic). It is, therefore, possible to make a change from the soft characteristic to the hard characteristic with no delay in time.

The suspension control system provide the following advantages:

First, the suspension control system of the invention requires information on sprung mass vertical velocities $\Delta x_{FL}$, $\Delta x_{FR}$, $\Delta x_{RL}$ and $\Delta x_{RR}$ and relative velocities $(\Delta x-\Delta x_0)_{FL}$, $(\Delta x-\Delta x_0)_{FR}$, $(\Delta x-\Delta x_0)_{RL}$ and $(\Delta x-\Delta x_0)_{RR}$. According to the invention only two sensors, that is, the vertical G sensors $1_{FL}$ and $1_{FR}$, are required to obtain the required information. Thus, the suspension control signal is simple and inexpensive.

Second, it is possible to provide an accurate estimation of the sprung mass vertical velocities at the respective rear road wheel side tower positions according to the transfer function $G_{R(S)}$ from the rear road wheel side sprung mass vertical velocities $x_{4sL}$ and $x_{4sR}$ calculated according to the transfer function $G_{R(S)}$ to the sprung mass vertical velocities $X_{4dL}$ and $x_{4dR}$ at the front road wheel side tower positions with the road surface input as the transfer route. This is effective to produce optimum control forces.

Figure 22A:
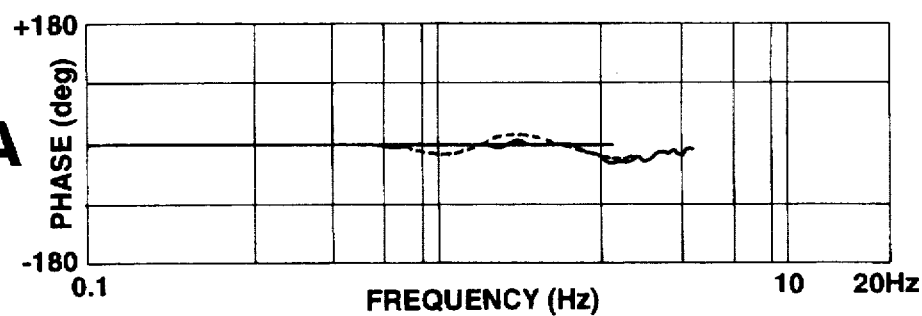
FIG. 22A is a graph of phase versus frequency.
Figure 22B:
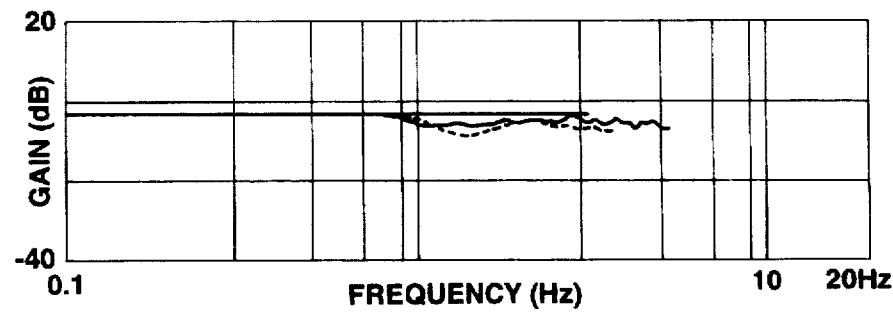
FIG. 22B is a graph of gain versus frequency.

FIG. 22A graphically depicts the phase characteristic curves by plotting the phase against the frequency. The broken curve relates to a phase characteristic resulting from calculations made with the use of the transfer function $G_{R(S)}$ based on only the vertical inputs $x_{4dL}$ and $x_{4dR}$ at the rear-left and -right road wheel side tower position. The solid curve relates to a phase characteristic resulting from, calculation made with the use of the transfer function $G_{R(S)}$ based on the vertical inputs $x_{4dL}$ and $x_{4dR}$ at the rear-left and -right road wheel side tower position and also the inputs $X_{4sL}$ and $x_{4sR}$ at the rear-left and -right road wheel side tower positions resulting from the interference of the vehicle body in the vehicle rolling direction. FIG. 22B graphically depicts the gain characteristic curves by plotting the gain against the frequency. The broken curve relates to a gain characteristic resulting from calculations made with the use of the transfer function $G_{R(S)}$ based on only the vertical inputs $x_{4dL}$ and $x_{4dR}$ at the rear-left and -right road wheel side tower position. The solid curve relates to a gain characteristic resulting from calculation made with the use of the transfer function $G_{R(S)}$ based on the vertical inputs $X_{4dL}$ and $x_{4dR}$ at the rear-left and -right road wheel side tower position and also the inputs $x_{4sL}$ and $x_{4sR}$ at the rear-left and -right road wheel side tower positions resulting from the interference of the vehicle body in the vehicle rolling direction. As can be seen from comparisons between the broken and solid curves, it is possible in this embodiment to obtain values very closer to the actual sprung mass vertical velocities at the rear-left and -right road wheel side tower positions.

Third, the delay time R, which is the difference of the system response delay time $\Phi$ from the delay transfer function corresponding to a delay between the time at which the front wheel side road surface input $x_3$ occurs and the time at which the rear wheel side road surface input $X_6$ occurs, is used to permits production of control forces to the rear road wheel side shock absorbers with no-system response delay.

Figure 23:
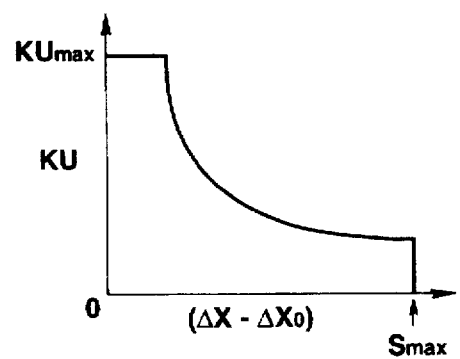
FIG. 23 is a graph reciprocal KU versus relative velocity $(\Delta x - \Delta x_0)$.

While the invention has been described in connection with the shock absorbers of the type having a low damping force characteristic set in one of the extension and compression phases when the damping force characteristic is changed in the other phase, it is to be understood that the invention can be used with shock absorbers of the type having damping force characteristics variable in both of the extension and compression phases. While the invention has been described in connection with the transfer function $G_{U(S)}$ calculated from Equation (1) to calculate the relative velocities $(\Delta x-\Delta x_0)$ [$(\Delta x-\Delta x_0)_{FL}$ and $(\Delta x-\Delta x_0)_{FR}$] based on the vertical accelerations $G_{FL}$ and $G_{FR}$ and the transfer function $G_{R(S)}$ calculated from Equation (5) to calculate the vertical inputs $x_{4dL}$ and $x_{4dR}$ based o the vertical accelerations $G_{FL}$ and $G_{FR}$, it is to be understood that, if these transfer functions are high-order transfer functions, approximate low-order transfer functions or approximate filters may be used to avoid the tendency toward complex equations and programs requiring an increased memory capacity. While the invention has been described in connection with the control signals V calculated from Equation (2), it is to be understood that the control signals V may be calculated from the following equation:

$$V=V'=\Delta x \cdot KU \qquad (7)$$

where KU is the reciprocal of the relative velocity $(\Delta x-\Delta x_0)$. This is effective to prevent the control signals V from diverging to infinity. The reciprocal KU may be calculated from the relationship programmed into the computer. For example, this relationship is shown in FIG. 23. The reciprocal KU is set at a predetermined maximum value when the relative velocity $(\Delta x-\Delta x_0)$ is equal to or less than a predetermined lower limit Smin and at a predetermined minimum value when the relative velocity, $(\Delta x-\Delta x_0)$ is equal to or greater than a predetermined, upper limit Smax. While the invention has been described in connection with a target damping force characteristic position calculated based on the control signal V from Equation (3), it is to be understood that a dead zone $V_{NC}$ may be provided to prevent the target damping force characteristic position P from hunting due to small variations in the control signal V near the point 0. In this case, the target damping force characteristic position P may be calculated from the following equation:

$$P=(V-V_{NC}/V_H-V_{NC}) \, Pmax \qquad (8)$$

The gain of Equation (2) may be changed according to the vehicle speed. While the invention has been described in connection with sprung mass vertical acceleration sensors to sense the front-left and -right road wheel side vehicle behavior, it is to be understood that these, sensors may be removed and replaced with displacement sensors positioned to sense the front-left and -right road wheel side sprung mass vertical displacements. While the invention has been described in connection with the front-left and -right road wheel side vehicle behavior detecting means positioned at the front-left and -right road wheel side tower positions, it is to be understood that position correcting means may be provided which uses predetermined transfer functions to calculate the vehicle behavior at the front-left and -right road wheel side tower positions based on the signals fed from the front-left and -right road wheel side vehicle behavior detecting means.

Figure 24:
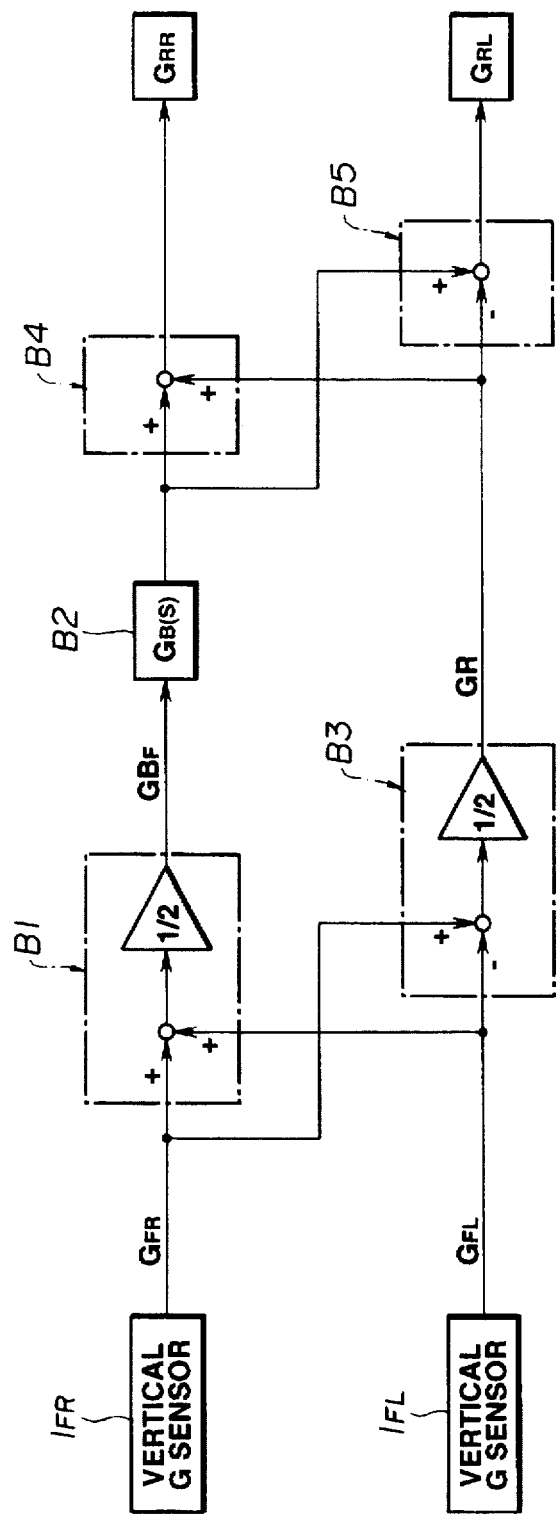
FIG. 24 is a block diagram showing a signal processing circuit used in a second embodiment of the suspension control system of the invention.

Referring to FIGS. 24 to 30, there is shown a second embodiment of the suspension control system of the invention. FIG. 24 is a block diagram showing a signal processing circuit included in the interface unit 4a for calculating sprung mass vertical accelerations G ($G_{FL}$, $G_{FR}$, $G_{RL}$, $G_{RR}$) at the respective tower positions. The signal processing circuit includes five blocks (B1 to B5). The first block B1 employs a calculation circuit which receives sensor signals fed thereto from the respective vertical G sensors $1_{FL}$ and $1_{FR}$, these sensor signals indicating sprung mass vertical acceleration signals $G_{FL}$ and $G_{FR}$ at the front-left and -right road wheel side tower positions and calculates a bounce rate $GB_F$ at the center between the front wheels based on the, sprung mass vertical acceleration signals $G_{FL}$ and $G_{FR}$ from the following equation:

$$GB_F=(G_{FR}+G_{FL})/2 \quad (9)$$

The block B2 employs a transfer function $G_{B(S)}$ with the road surface input as its transfer route from the front road wheel position to the rear road wheel position to calculate a bounce rate $GB_R$ at the center between the rear road wheels based on the bounce rate $GB_F$ at the center between the front road wheels. This transfer function is given as:

$$G_{B(S)}=G_{1(S)} \cdot G_{2(S)} \cdot G_{3(S)} \quad (10)$$

where $G_{1(S)}$ is the transfer function from the front road wheel side sprung mass to the road surface, $G_{2(S)}$ is the transfer function from the rear road wheel side road surface to the rear road wheel side sprung mass, and $G_{3(S)}$ is the delay transfer function for an input time difference between the vehicle body portions at the front and rear road wheel positions. The delay transfer function $G_{3(S)}$ is calculated as:

$$G_{3(S)}=e^{-s(W_B/S_V)} \quad (11)$$

where $W_B$ is the vehicle wheel base and $S_V$ is the vehicle speed. The block B3 employs a calculation circuit which receives sensor signals fed thereto from the respective vertical G sensors $1_{FL}$ and $1_{FR}$, these sensor signals indicating sprung mass vertical acceleration signals $G_{FL}$ and $G_{FR}$ at the front-left and -right road wheel side tower positions and calculates a vehicle roll rate GR based on the front-left and -right road wheel side sprung mass vertical acceleration signals $G_{FL}$ and $G_{FR}$ from the following equation:

$$GR=(G_{FR}-G_{FL})/2 \quad (12)$$

The block B4 employs a calculation circuit which receives the bounce rate $GB_R$ at the center between the rear road wheels fed from the block A1 and the roll rate GR fed from the block A3 and calculates the sprung mass vertical acceleration $G_{RR}$ at the rear-right road wheel side tower position from the following equation:

$$G_{RR}=GB_R+GR \quad (13)$$

The block B5 employs a calculation circuit which receives, the bounce rate $GB_R$ at the center between the rear road wheels fed from the block A1 and the roll rate GR fed from the block A3 and calculates the sprung mass vertical acceleration $G_{RL}$ at the rear-left road wheel side tower position from the following equation:

$$G_{RR}=GB_R+GR \quad (14)$$

Figure 25:
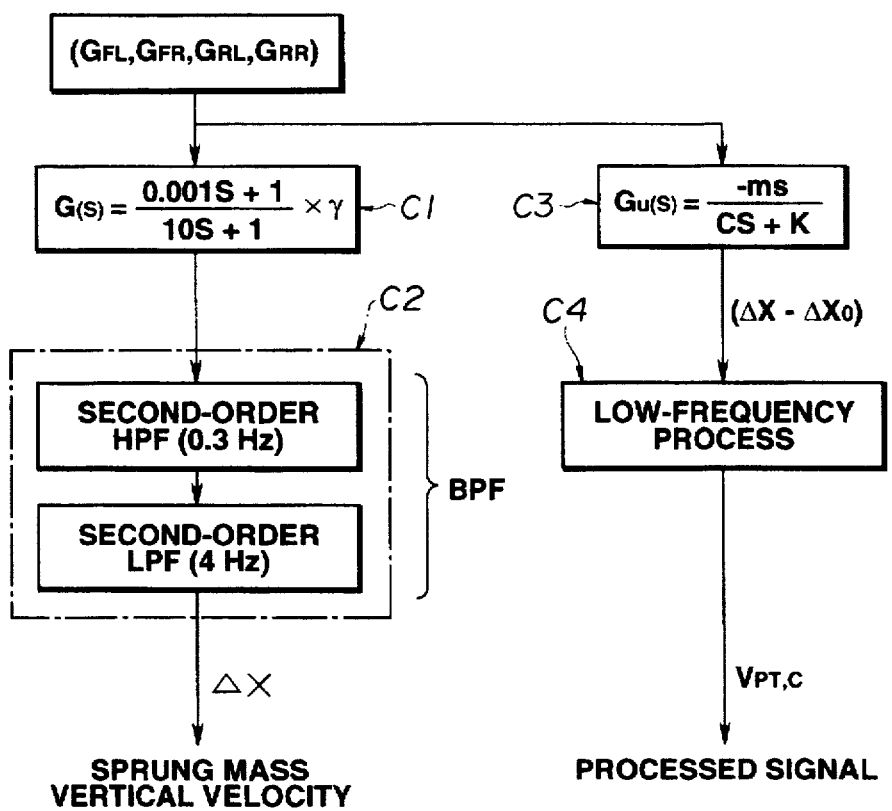
FIG. 25 is a block diagram showing another signal processing circuit used in the second embodiment of the suspension control system of the invention.
Figure 26A:
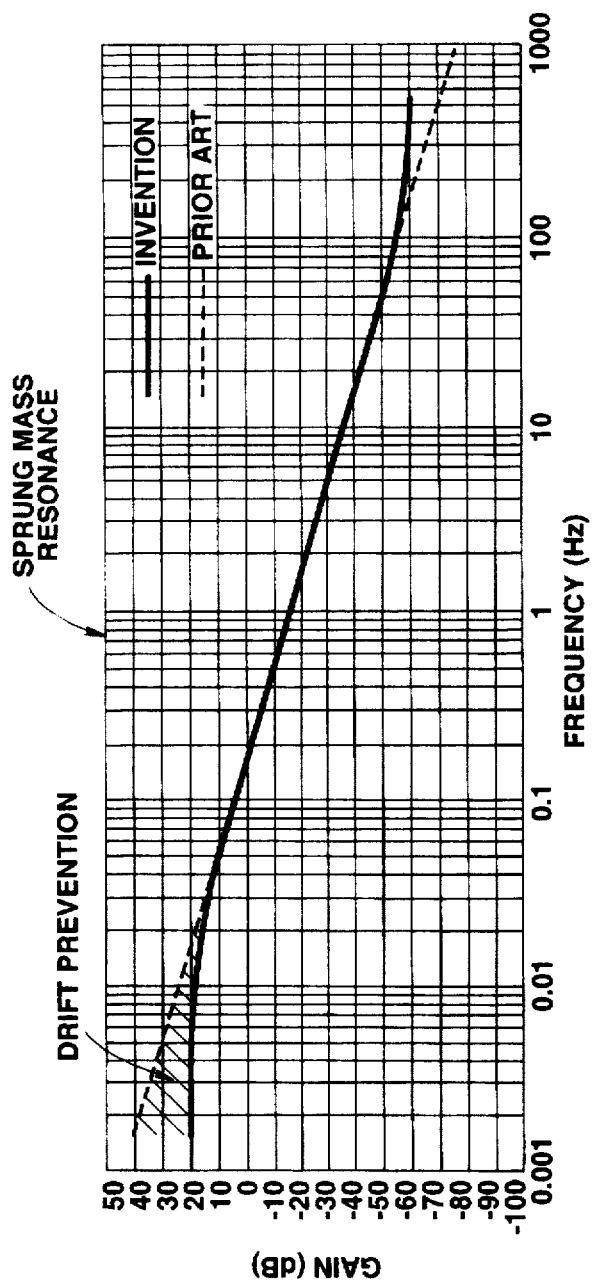
FIG. 26A is a graph of gain versus frequency.
Figure 26B:
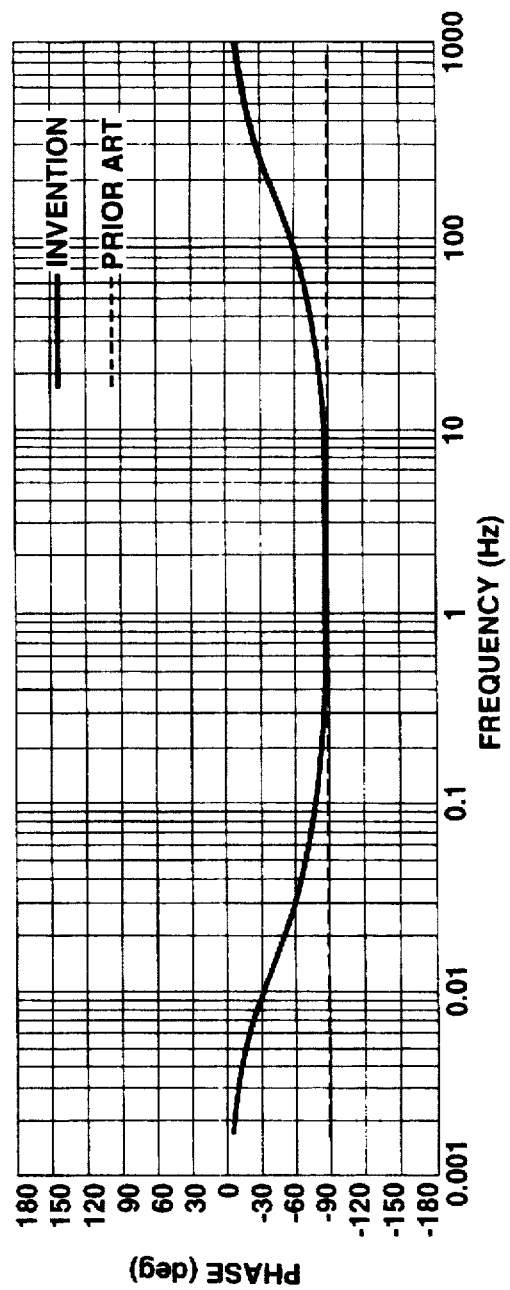
FIG. 26B is a graph of phase versus frequency.
Figure 27:
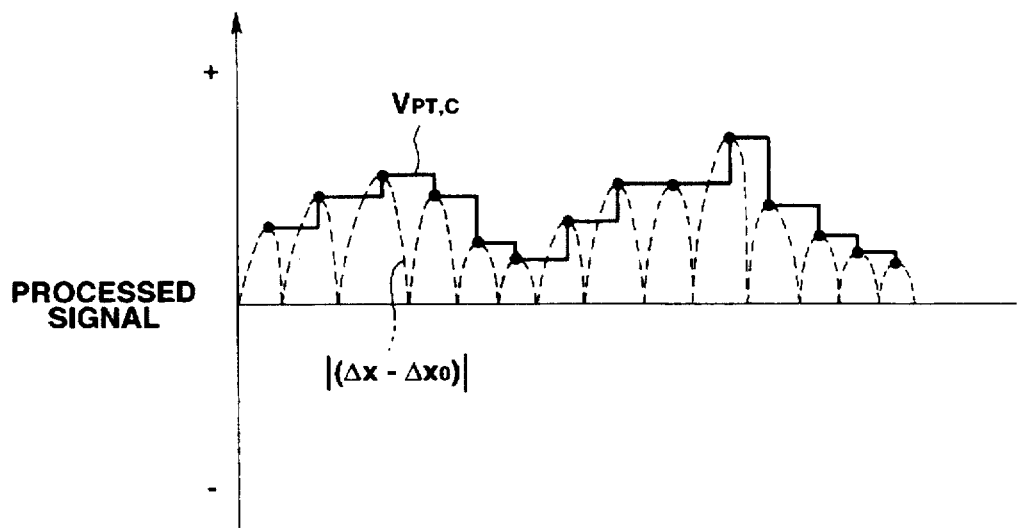
FIG. 27 is a graph used in explaining the formation of the processed signal used in the second embodiment of the suspension control system of the invention.

FIG. 25 is a block diagram showing a signal processing circuit which includes blocks B1 to B4 for calculating the sprung up vertical velocities Δx, relative velocities (Δx−Δx$_0$) and low-frequency signal $V_{PT, C}$ based on the sprung mass-vertical accelerations G ($G_{FL}$, $G_{FR}$, $G_{RL}$, $G_{RR}$) obtained from the signal processing circuit of FIG. 24. The block C1 employs a phase delay compensation equation to convert the sprung mass vertical accelerations G ($G_{FL}$, $G_{FR}$, $G_{RL}$, $G_{RR}$) into sprung, mass vertical velocities at the respective tower positions. The phase delay compensation equation is given as:

$$G_{(S)}=(AS+1)/(BS+1) \quad (15) \ (A<B)$$

A transfer function is used to provide phase and gain characteristics equivalent to the integration (1/S) in the frequency band (0.5 Hz to 3 Hz) required for the damping force characteristic control so as to decrease the gain on the low frequency side (−0.05 Hz). This transfer function is given as the following phase delay compensation equation:

$$G_{(S)}=(0.001 \ S+1)/(10S+1) \times \gamma \quad (16)$$

where γ is the gain required to match the sprung mass vertical velocity, signal obtained through the integration (1/S) with the gain characteristic. In this case, γ=10. It is, therefore, possible to reduce the gain on the low frequency side without degrading the phase characteristic in the frequency band (0.5 Hz–3 Hz) required for the damping force characteristic control, as indicated by the solid curves of FIGS. 26A and 26B. The broken curves of FIGS. 26A and 26B indicate the gain and phase characteristics of the sprung mass vertical velocity signal obtained through the integration (1/S).

The block C2 has a band pass filter function of filtering out the components except for the target frequency band. The band pass filter BPF includes a second-order high pass filter HPF (0.3 Hz) and a second-order low pass filter LPF (4 Hz) of obtain sprung mass vertical velocities Δx(Δx$_{FL}$, Δx$_{RL}$, Δx$_{RR}$) at the target control frequency band corresponding to the sprung mass resonance frequency band. The block C3 employs a transfer function $G_{u(S)}$ to derive the relative velocities (Δx−Δx$_0$) [(Δx−Δx$_0$)$_{FL}$, (Δx−Δx$_0$)$_{FR}$, (Δx−Δx$_0$)$_{RL}$, (Δx−Δx$_0$)$_{RR}$] based on the vertical accelerations G ($G_{FL}$, $G_{FR}$, $G_{RL}$, $G_{RR}$) detected by the vertical G sensors 1. The transfer function $G_{u(S)}$ are given as:

$$G_{u(S)}=-mS/(cS+k) \quad (17)$$

where m is the sprung mass, c is the attenuation coefficient of the suspension, k is the spring constant of the suspension, and S is a Laplace operator expressed as S=σ+jω. The block C4 detects the peaks of the absolute values of the relative velocity signal (Δx−Δx$_0$) (high frequency signal), as indicated by the broken curves of FIG. 27, and forms a processed signal $V_{PT,C}$ (low-frequency signal) having a value maintained at the last peak of the relative velocity signal until the next peak of the relative velocity signal, as indicated by the solid curves of FIG. 27.

Figure 28:
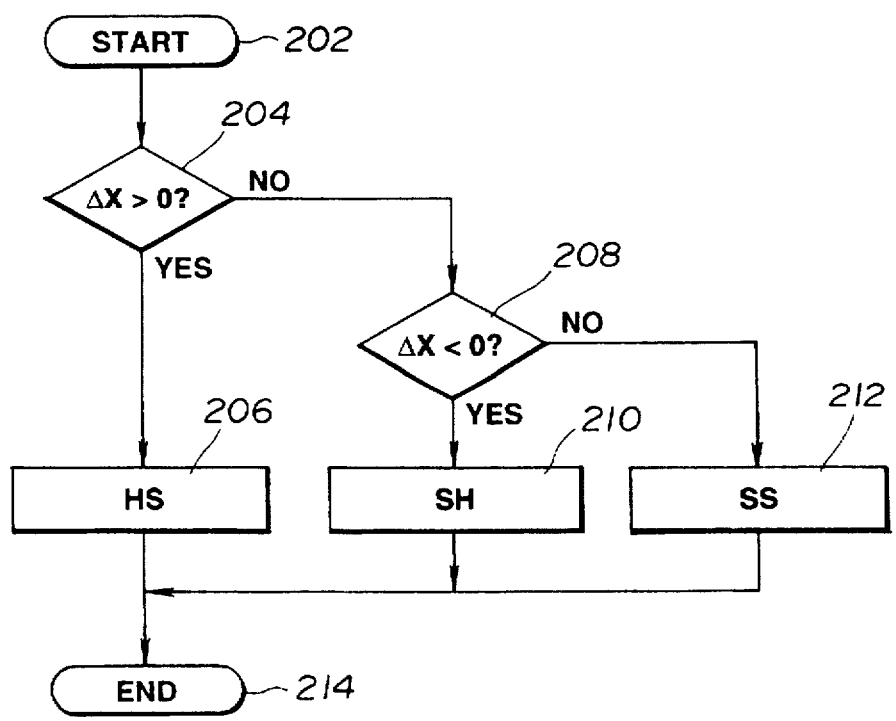
FIG. 28 is a flow diagram of the programming of the digital computer as it is used to control the damping force characteristic of each of the shock absorbers in the second embodiment of the suspension control system of the invention.

FIG. 28 is a flow diagram illustrating the programming of the digital computer as it is used to control the damping force characteristic of each of the shock absorbers SA. The computer program is entered at the point 202. At the point 204 in the program a determination is made as to whether or not the sprung mass vertical velocity Δx for the corresponding one of the shock absorbers SA is positive. If the answer to this question is "yes", then the program proceeds to the point 206 where a command is produced to operate the shock absorber in the extension phase hard range HS and then to the end point 214. Otherwise, the program proceeds to another determination step at the point 208. This determination is as to whether or not the sprung mass vertical velocity Δx is negative. If the answer to this question is "yes", then the program proceed to the point 210 where a command is produced to operate the shock absorber in the compression phase hard range SH and then to the end point 214. Otherwise, it means that the sprung mass vertical velocity Δx is zero and the program proceeds to the point 212 where a command is produced to operate the shock absorber in the soft range SS. Following this, the program proceeds to the end point 214.

Figure 29A:
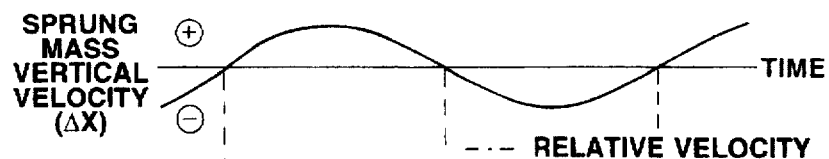
FIGS. 29A to 29E are graphs used in explaining the damping force characteristic control made in the second embodiment of the suspension control system of the invention.
Figure 29B:
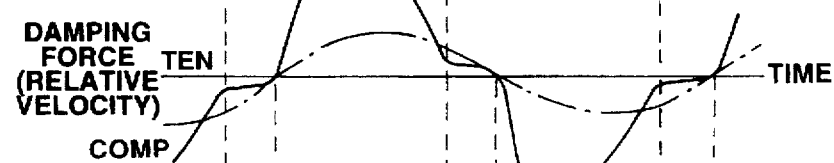
Figure 30:
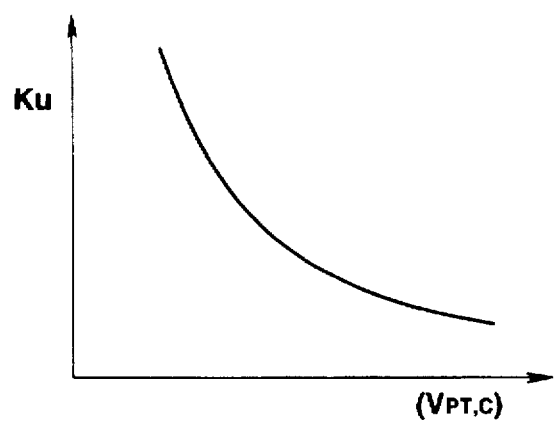
FIG. 30 is a graph of gain Ku versus processed signal $V_{PT,C}$.

Referring to FIGS. 29A to 29E, the damping force characteristic control will be described further. It is now assumed that the sprung mass vertical velocity Δx changes with time as shown in FIG. 29A. When the sprung mass vertical velocity Δx is at zero, the shock absorber is controlled to have a damping force characteristic placed in the soft range SS where both of the extension and compression phases exhibit predetermined fixed low damping force characteristics. When the sprung mass vertical velocity Δx has a positive value, the damping force characteristic of the shock absorber is controlled in the extension phase hard range, HS where the compression phase is fixed at a predetermined low (soft) damping force characteristic. The extension phase damping force characteristic (target damping force characteristic position $P_T$) is changed in direct proportion to the sprung mass vertical velocity Δx. In this case, the target damping force characteristic position $P_T$ is calculated as:

$$P_T = \alpha \cdot \Delta x \cdot Ku \quad (18)$$

where α is the constant in the extension phase and Ku ($=a/(\Delta x - \Delta x_0)$) is the gain set according to the relative velocity ($\Delta x - \Delta x_0$) and the processed signal $V_{PT,C}$, as shown in FIG. 30.

When the sprung mass vertical velocity Δx has a negative value, the damping force characteristic of the shock absorber is controlled in the compression phase hard range SH to provide a predetermined low (soft) damping force characteristic in the extension phase and the compression phase damping force characteristic (target damping force characteristic position $P_c$ is varied in direct proportion to the sprung mass vertical velocity Δx as:

$$P_c = \beta \cdot \Delta x \cdot Ku \quad (19)$$

where β is the constant in the compression phase.

Figure 29C:
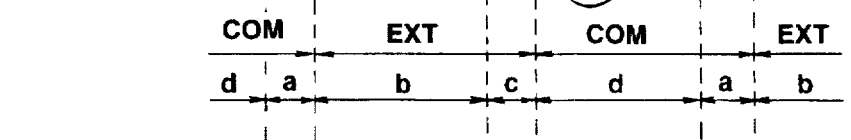
Figure 29D:
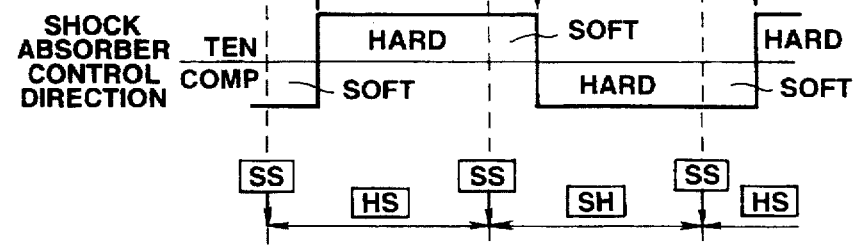
Figure 29E:
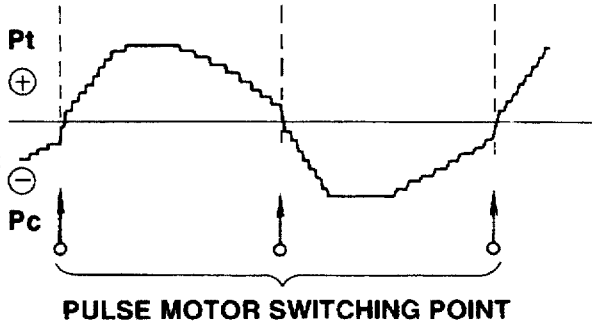

In FIG. 29C, the characteristic a designates a control range-where the sprung mass vertical velocity Δx, which is calculated based on the sprung mass vertical velocity Δx and relative velocity ($\Delta x - \Delta x_0$), changes from its negative sign (downward) to its positive sign (upward). Since the relative velocity ($\Delta x - \Delta x_0$) remains negative (the shock absorber operates in the compression phase), the shock absorber is controlled in the extension phase hard range HS according to the sign (direction) of the sprung mass vertical velocity Δx. In the control range a, thus, the shock absorber is controlled to provide a soft characteristic in the compression phase.

In the control range b where the sing of the sprung mass vertical velocity Δx remains positive (upward) and the relative velocity ($\Delta x - \Delta x_0$) changes from its negative sign to its positive sign indicating the extension phase (EXT) of the shock absorber, the shock absorber is controlled in the extension phase hard range HS according to the sign (direction) of the sprung mass vertical velocity Δx and the shock absorber is in the extension phase. In this control range, thus, the shock absorber is controlled to have a hard characteristic in direct proportion to the sprung mass vertical velocity Δx in the extension phase corresponding to the present phase of the shock absorber.

In the control range c where the sprung mass vertical velocity Δx changes from its positive sign (upward) to its negative sign (downward) with the relative velocity ($\Delta x - \Delta x_0$) having a positive sign indicating the extension phase (EXT) of the shock absorber, the shock absorber is controlled in the compression phase hard range SH according to the sign of the sprung mass vertical velocity Δx. In this control range, thus, the shock absorber is controlled to have a soft characteristic in the extension phase corresponding to the present phase of the shock absorber.

In the control range d where the sign of the sprung mass vertical velocity Δx remains negative (downward) and the relative velocity ($\Delta x - \Delta x_0$) changes from its positive sign to its negative sign indicating the extension phase (EXT) of the shock absorber, the shock absorber is controlled in the compression phase hard range SH based on the sign of the sprung mass vertical velocity Δx. In this control range, thus, the shock absorber is controlled to have a hard characteristic in the compression phase corresponding to the present phase of the shock absorber.

In this embodiment, the shock absorber is controlled to provide a hard characteristic in the present phase of the shock absorber when the sings of the sprung mass vertical velocity Δx and the relative velocity ($\Delta x - \Delta x_0$) are the same (control ranges b and d) and to provide a soft characteristic in the present phase of the shock absorber when the signs of the sprung mass vertical velocity Δx and the relative velocity ($\Delta x - \Delta x_0$) are different (control ranges a and c). It is, therefore, possible to perform the same control as the damping force characteristic control made based on a sky hook theory based on the sprung mass vertical velocity Δx only. Furthermore, the damping force characteristic position has been switched to the hard characteristic side in the previous control ranges a and c at the time when the phase of the shock absorber is switched, that is, in response to a change from the control range a to the control range b and also to a change from the control range c to the control range d (from the soft characteristic to the hard characteristic). It is, therefore, possible to make a change from the soft characteristic to the hard characteristic with no delay in time. This is effective to provide a very fast control response. Since a change from the hard characteristic to the soft characteristic is made without driving the pulse motor 3, it is possible to increase the pulse motor durability and save the power consumption.

The vertical G sensors 1 would detect negative (downward) sprung mass vertical acceleration components when the vehicle is decelerated in its diving position in the presence of vehicle braking. The low-frequency downward sprung mass vertical acceleration components would cause the signal to drift. The signal may drift during rapid vehicle acceleration, during vehicle acceleration on a long upward slope (in this case upward sprung mass vertical acceleration components are detected), during vehicle acceleration on a long downward slope or in the presence of low-frequency DC components introduced onto the signals from the vertical G sensors 1. In this embodiment, however, a phase delay compensation equation is utilized to convert the sprung mass vertical accelerations G into corresponding sprung mass vertical velocities. This is effective to reduce the gain in the low-frequency band without degrading the phase characteristic in the frequency band (0.5 Hz–3 Hz) required for the damping force characteristic, control. It is, therefore, possible to keep the damping force characteristic control free from the influence of the low-frequency side gain reduction even when the signals produced from the vertical G sensors have low frequency components introduced thereon.

Figure 31:
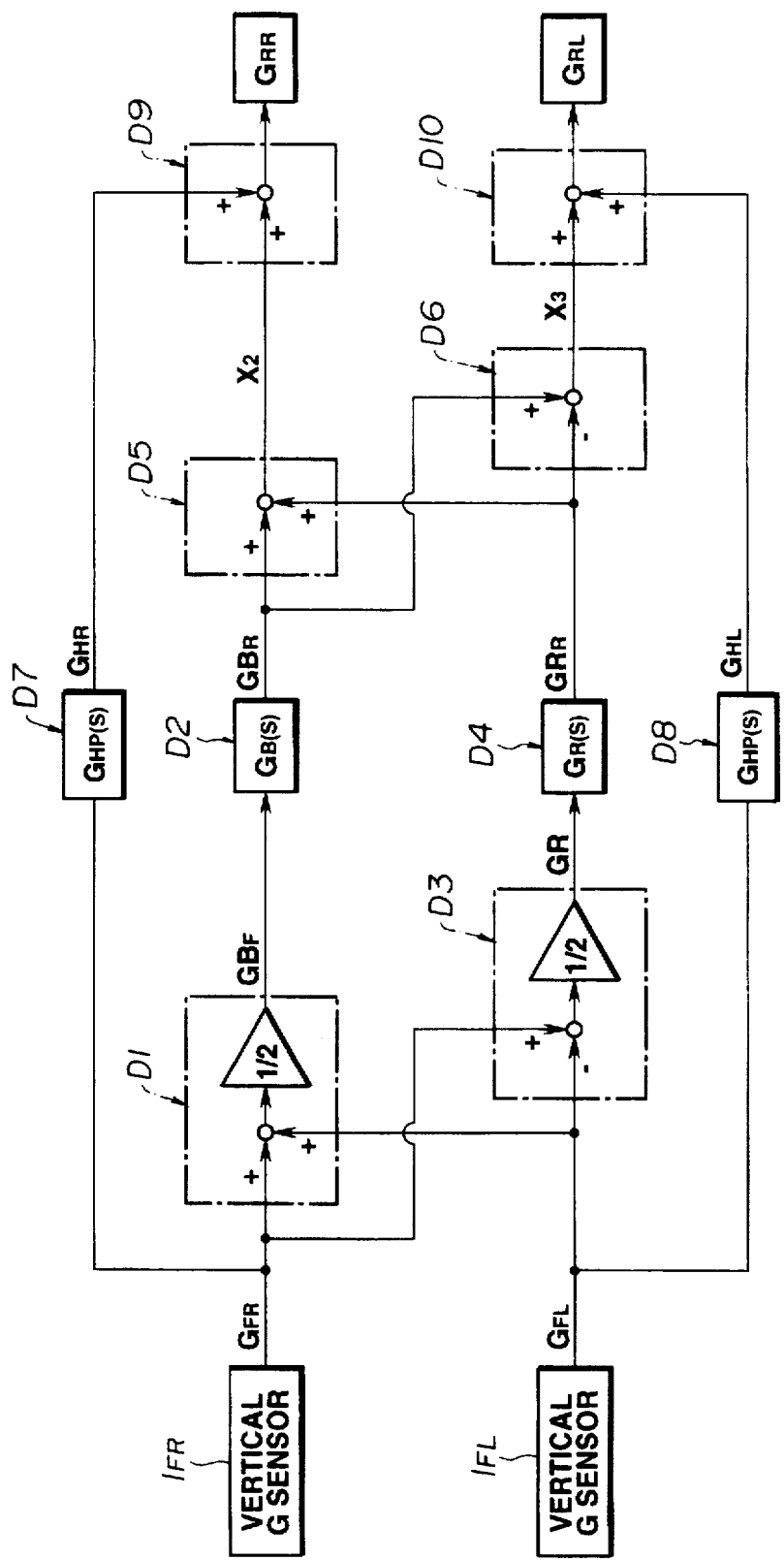
FIG. 31 is a block diagram showing a signal processing circuit used in a third embodiment of the suspension control system of the invention.

Referring to FIG. 31, there is shown a third embodiment of the suspension control system of the invention this embodiment is substantially the same as the second embodiment except for the signal processing circuit included in the interface unit 4a. In this embodiment the signal processing circuit includes ten blocks (D1 to D10). The first block D1 employs a calculation circuit which receives sensor signals fed thereto from the respective vertical G sensors $1_{FL}$ and $1_{FR}$, these sensor signals indicating sprung mass vertical acceleration signals $G_{FL}$ and $G_{FR}$ at the front-left and -right road wheel side tower positions and calculates a bounce rate $GB_F$ at the center between the front wheels based on the sprung mass vertical acceleration signals $G_{FL}$ and $G_{FR}$ from Equation (9). The block D2 employs a transfer function $G_{B(S)}$ with the road surface input as its transfer route from the front road wheel position to the rear road wheel position to calculate a bounce rate $GB_R$ at the center between the rear road wheels based on the bounce rate $GB_F$ at the center between the front road wheels. This transfer function is given by Equation (10).

The block D3 employs a calculation circuit which receives sensor signals fed thereto from the respective vertical G sensors $1_{FL}$ and $1_{FR}$, these sensor signals indicating sprung mass vertical acceleration signals $G_{FL}$ and $G_{FR}$ at the front-left and -right road wheel side tower positions and calculates a vehicle roll rate GR based on the front-left and -right road wheel side sprung mass vertical acceleration signals $G_{FL}$ and $G_{FR}$ from Equation (12). The block D4 employs a transfer function $G_{R(S)}$ from the front road wheel position to the rear road wheel position to calculate a roll rate $GR_R$ on the rear road wheel side based on the vehicle roll rate GR detected on the front road wheel side. The block D5 employs a calculation circuit which receives the bounce rate $GB_R$ at the center between the rear road wheels fed from the block D2 and the roll rate $GR_R$ fed from the block D4 and calculates the sum $(GB_R+GR_R)$ of the bounce and roll rates. The block D6 employs a calculation circuit which receives the bounce rate $GB_R$ at the center between the rear road wheels fed from the block D2 and the roll rate $GR_R$ fed from the block D4 and calculates a difference $(GB_R-GR_R)$ of the roll rate from the bounce rate.

The block D7 employs a transfer function $G_{HP(S)}$ with the body as the transfer route from the front wheel position to the rear wheel position to calculate the high-frequency component $GH_R$ of the sprung mass vertical acceleration transmitted toward the rear wheel side. The block D8 employs a transfer function $G_{HP(S)}$ with the body as the transfer route from the front wheel position to the rear wheel position to calculate the high-frequency component $GH_L$ of the sprung mass vertical acceleration transmitted toward the rear wheel side. The block D9 employs a calculation circuit which receives the sum $(GB_R+GR_R)$ fed from the block D5 and the high-frequency component $GH_R$ fed from the block D7 and calculates the sprung mass vertical acceleration $G_{RR}$ at the rear-right road wheel side tower position from the following equation:

$$G_{RR}=(GB_R+GR_R)+G_{HR} \quad (20)$$

The block D10 employs a calculation circuit which receives the difference $(GB_R-GR_R)$ fed from the block D6 and the high-frequency component $GH_L$ fed from the block D8 and calculates the sprung mass vertical accelerations $G_{RL}$ the rear-left road wheel side tower position from the following equation:

$$G_{RL}=(GB_R-GR_R)+G_{HL} \quad (21)$$

In this embodiment, the rear road wheel side roll rate $GR_R$ is used in the place of the vehicle roll rate GR detected on the front wheel side. Furthermore, the high-frequency components $G_{RR}$ and $G_{RL}$ of the sprung mass vertical accelerations transmitted through the vehicle body to the rear wheels are taken into consideration. It is, therefore, possible to estimate the rear-left and -right road wheel side sprung mass vertical acceleration $G_{RR}$ and $G_{RL}$ with greater accuracy.

While the invention has been described in connection with sprung mass vertical accelerations as vertical inputs, it is to be understood that the vertical inputs may be in the form of relative displacements between sprung and unsprung masses. While the, invention has been described in connection with the control for maintaining the damping force characteristic of the shock absorber in the soft range SS when the sprung mass vertical velocity is zero, it is to be understood that the damping force characteristic may be held in the soft range SS when the sprung mass vertical velocity is in a dead zone set around zero. This is effective to avoid control hunting.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A suspension control system for use with an automotive vehicle supported on front-left and -right road wheels at front-left and -right road wheel side tower positions and also on rear-left and -right road wheels at rear-left and -right road wheel side tower positions, comprising:

shock absorbers provided between sprung and unsprung masses of the vehicle at the respective tower positions for providing variable damping force characteristics;

sensors for sensing first behaviors of the vehicle at the front-left and -right road wheel side tower positions;

a control unit for calculating second behaviors of the vehicle at the rear-left and -right road wheel side tower positions based on the sensed first vehicle behaviors by using a predetermined transfer function with a road surface input as its transfer route and a difference between the sensed first vehicle behaviors, the control unit producing first control signals for the shock absorbers mounted at the front-left and -right road wheel side tower positions based on the sensed first vehicle behaviors, and producing second control signals for the shock absorbers mounted at the rear-left and -right road wheel side tower positions based on the calculated second vehicle behaviors; and actuators responsive to the first and second control signals for controlling the damping force characteristics of the corresponding shock absorbers.

2. The suspension control system as claimed in claim 1, wherein the sensors detect sprung mass vertical accelerations at the front-left and -right road wheel side tower positions.

3. The suspension control system as claimed in claim 2, wherein the control unit has a second predetermined transfer function for calculating relative velocities between sprung and unsprung masses at the respective tower positions based on the first and second vehicle behaviors.

4. The suspension control system as claimed in claim 2, wherein the control unit converts the first vehicle behaviors into corresponding velocities at the front-left and -right road wheel side tower positions.

5. The suspension control system as claimed in claim 2, wherein the sensors are mounted at sensor positions except for the front-left and -right road wheel side tower positions for detecting third vehicle behaviors at the sensor positions, and wherein the control unit has a second predetermined transfer function to calculate the first vehicle behaviors based on the third vehicle behaviors.

6. The suspension control system as claimed in claim 2, wherein the sensors are mounted at the front-left and -right road wheel side tower positions.

7. The suspension control system as claimed in claim 2, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicting a downward direction.

8. The suspension control system as claimed in claim 2, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

9. The suspension control system as claimed in claim 1, wherein the sensors detects sprung mass vertical displacements at the front-left and -right road wheel side tower positions.

10. The suspension control system as claimed in claim 9, wherein the control unit converts the first vehicle behaviors into corresponding velocities at the front-left and -right road wheel side tower positions.

11. The suspension control system as claimed in claim 9, wherein the sensors are mounted at sensor positions except for the front-left and -right road wheel side tower positions for detecting third vehicle behaviors at the sensor positions, and wherein the control unit has a second predetermined transfer function to calculate the first vehicle behaviors based on the third vehicle behaviors.

12. The suspension control system as claimed in claim 9, wherein the sensors are mounted at the front-left and -right road wheel side tower positions.

13. The suspension control system as claimed in claim 9, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

14. The suspension control system as claimed in claim 9, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

15. The suspension control system as claimed in claim 1, wherein the control unit has a second predetermined transfer function for calculating relative velocities between sprung and unsprung masses at the respective tower positions based on the first and second vehicle behaviors.

16. The suspension control system as claimed in claim 15, wherein the control unit converts the first vehicle behaviors into corresponding velocities at the front-left and -right road wheel side tower positions.

17. The suspension control system as claimed in claim 15, wherein the sensors are mounted at sensor positions except for the front-left and -right road wheel side tower positions for detecting third vehicle behaviors at the sensor positions, and wherein the control unit has a third predetermined transfer function to calculate the first vehicle behaviors based on the third vehicle behaviors.

18. The suspension control system as claimed in claim 15, wherein the sensors are mounted at the front-left and -right road wheel side tower positions.

19. The suspension control system as claimed in claim 15, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

20. The suspension control system as claimed in claim 15, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

21. The suspension control system as claimed in claim 1, wherein the control unit converts the first vehicle behaviors into corresponding velocities at the front-left and -right road wheel side tower positions.

22. The suspension control system as claimed in claim 21, wherein the sensors are mounted at sensor positions except for the front-left and -right road wheel side tower positions for detecting third vehicle behaviors at the sensor positions, and wherein the control unit has a second predetermined transfer function to calculate the first vehicle behaviors based on the third vehicle behaviors.

23. The suspension control system as claimed in claim 21, wherein the sensors are mounted at the front-left and -right road wheel side tower positions.

24. The suspension control system as claimed in claim 12, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

25. The suspension control system as claimed in claim 21, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

26. The suspension control system as claimed in claim 1, the sensors are mounted at sensor positions except for the front-left and -right road wheel side tower positions for detecting third vehicle behaviors at the sensor positions, and wherein the control unit has a second predetermined transfer function to calculate the first vehicle behaviors based on the third vehicle behaviors.

27. The suspension control system as claimed in claim 26, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

28. The suspension control system as claimed in claim 26, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

29. The suspension control system as claimed in claim 1, the sensors are mounted at the front-left and -right road wheel side tower positions.

30. The suspension control system as claimed in claim 29, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

31. The suspension control system as claimed in claim 29, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

32. The suspension control system as claimed in claim 1, wherein the control unit controls each of the shock absorbers to have a low damping force characteristic in one of extension and compression phases when the shock absorber is controlled to have a variable damping force characteristic in the other phase, the control unit varying the damping force characteristic in the extension phase of the shock absorber when the first or second control signals have a sign indicating an upward direction and in the compression phase of the shock absorber when the first and second control signals have a sign indicating a downward direction.

33. The suspension control system as claimed in claim 32, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

34. The suspension control system as claimed in claim 1, further including a vehicle speed sensor for detecting a vehicle speed, and wherein the transfer function includes a delay transfer function for setting a delay time corresponding to a difference of a system response delay from a delay between the time a road surface input occurs from the front road wheels and the time a road surface input occurs from the rear road wheels, the delay being calculated as a function of vehicle wheel base and vehicle speed.

35. A suspension control system for use with an automotive vehicle having a vehicle body supported on front-left and -right road wheels at front-left and -right road wheel side tower positions and also on rear-left and -right road wheels at rear-left and -right road wheel side tower positions, comprising:

shock absorbers provided between sprung and unsprung masses of the vehicle at the respective tower positions for providing variable damping force characteristics;

sensors for sensing vertical inputs to the vehicle body at the front-left and -right road wheel side tower positions;

a control unit for averaging the sensed vertical inputs to calculate a first bounce rate at a center between the front-left and -right road wheel side tower positions, and a first roll rate based on the sensed vertical inputs, the control unit having a predetermined transfer function for calculating a second bounce rate at a center between the rear-left and -right road wheel side tower positions based on the calculated first bounce rate, the control unit calculating vertical inputs to the vehicle body at the rear-left and -right road wheel side tower positions based on the calculated first roll rate and the calculated second bounce rate, the control unit producing control signals for the shock absorbers based on the sensed and calculated vertical inputs; and actuators responsive to the control signals for controlling the damping force characteristics of the corresponding shock absorbers.

36. The suspension control system as claimed in claim 35, wherein the sensors detect sprung mass vertical accelerations at the front-left and -right road wheel side tower positions.

37. The suspension control system as claimed in claim 36, wherein the control unit calculates sprung mass vertical velocities at the respective tower positions based on the sensed and calculated vertical inputs, wherein each of the shock absorbers is operable in a soft range (SS) to provide a soft characteristic for the damping force characteristic of the shock absorber in extension and compression phases, an extension phase hard range (HS) to provide a variable hard characteristic for the damping force characteristic of the shock absorber in the extension phase with a soft characteristic fixed for the damping force characteristic of the shock absorber in the compression phase, and a compression phase hard range (SH) to provide a variable hard characteristic for the damping force characteristic of the shock absorber in the compression phase with a soft characteristic fixed for the damping force characteristic of the shock absorber in the extension phase, and wherein the actuators control the shock absorber in the soft range when the corresponding sensed sprung mass vertical velocity has a sign around zero, in the extension phase hard range (HS) when the corresponding sensed sprung mass vertical velocity has a positive sign and in the compression phase hard range (SH) when the corresponding sensed sprung mass vertical velocity has a negative sign.

38. The suspension control system as claimed in claim 35, wherein the sensors detect relative displacements between the sprung and unsprung masses at the front-left and -right road wheel side tower positions.

* * * * *